US009068822B2

(12) United States Patent
Sesko

(10) Patent No.: US 9,068,822 B2
(45) Date of Patent: Jun. 30, 2015

(54) CHROMATIC RANGE SENSOR PROBE DETACHMENT SENSOR

(71) Applicant: Mitutoyo Corporation, Kawasaki-shi, Kanagawa-ken (JP)

(72) Inventor: David William Sesko, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 217 days.

(21) Appl. No.: 13/935,465

(22) Filed: Jul. 3, 2013

(65) Prior Publication Data
US 2015/0009484 A1    Jan. 8, 2015

(51) Int. Cl.
G01B 11/14    (2006.01)
G01B 11/00    (2006.01)

(52) U.S. Cl.
CPC .............. G01B 11/14 (2013.01); G01B 11/007 (2013.01); G01B 2210/50 (2013.01)

(58) Field of Classification Search
CPC ................................ G01B 11/02; G01B 11/24
USPC ................................................. 356/3.01–3.15
See application file for complete search history.

(56) References Cited

U.S. PATENT DOCUMENTS

| | | |
|---|---|---|
| 4,651,405 A | 3/1987 | McMurtry |
| 4,688,307 A | 8/1987 | Schneider |
| 4,908,951 A | 3/1990 | Gurny |
| 4,979,284 A | 12/1990 | McMurtry |
| 5,118,956 A | 6/1992 | Dunning |
| 5,323,540 A | 6/1994 | McMurtry |
| 5,339,535 A | 8/1994 | McMurtry |
| 5,505,005 A | 4/1996 | McMurtry |
| 5,526,576 A | 6/1996 | Fuchs |
| 5,657,549 A | 8/1997 | Shen |

(Continued)

FOREIGN PATENT DOCUMENTS

| | | | | |
|---|---|---|---|---|
| DE | 102007054915 A1 | * | 10/2007 | ........... G01B 11/007 |
| DE | 10 2007 054 915 A1 | | 5/2009 | |
| WO | 2009062641 A1 | | 5/2009 | |

OTHER PUBLICATIONS

"Accessories for STIL Point Sensors," STIL S.A., Aix en Provence, France, <http://www.stilsa.com/EN/prod/chr/accessories.htm. [retrieved Apr. 26, 2012], 1 page.

(Continued)

*Primary Examiner* — Luke Ratcliffe
(74) *Attorney, Agent, or Firm* — Christensen O'Connor Johnson Kindness PLLC

(57) ABSTRACT

A system and method for a chromatic probe detachment sensor is provided. A detachment signal element is included in an interchangeable optics element of a probe. The detachment signal element is configured to substantially transmit a first set of wavelengths corresponding to a measuring range, and at least partially reflect a set of detachment element wavelengths. In one implementation, the detachment signal element comprises a thin film coating such as a sharp edge filter. The detection of a detachment condition can thus be achieved using the existing probe electronics without requiring the addition of other external sensors or wiring to the probe or coordinate measuring machine that utilizes the probe. The sensing of a detachment condition may be utilized to halt further movement of the probe to minimize damage in the event of a collision.

20 Claims, 12 Drawing Sheets

(56) References Cited

U.S. PATENT DOCUMENTS

| | | | |
|---|---|---|---|
| 5,705,814 | A | 1/1998 | Young |
| 5,825,666 | A | 10/1998 | Freifeld |
| 6,093,930 | A | 7/2000 | Boyette, Jr. |
| 6,275,053 | B1 | 8/2001 | Morrison |
| 6,546,643 | B2 | 4/2003 | Lotze |
| 6,633,051 | B1 | 10/2003 | Holloway |
| 6,940,610 | B2 | 9/2005 | Prinzhausen |
| 6,945,100 | B2 | 9/2005 | Kwon |
| 7,096,077 | B2 | 8/2006 | Price |
| 7,369,225 | B2 | 5/2008 | Messerschmidt |
| 7,486,394 | B2 | 2/2009 | Lehmann |
| 7,626,705 | B2 | 12/2009 | Altendorf |
| 7,652,275 | B2 | 1/2010 | Gladnick |
| 7,722,515 | B2 | 5/2010 | McMurty |
| 7,876,456 | B2 | 1/2011 | Sesko |
| 7,891,248 | B2 | 2/2011 | Hough |
| 7,908,757 | B2 | 3/2011 | Ferrari |
| 7,990,522 | B2 | 8/2011 | Sesko |
| 8,099,793 | B2 | 1/2012 | Jo |
| 8,194,251 | B2 | 6/2012 | Emtman |
| 8,212,997 | B1 | 7/2012 | Xie |
| 2002/0146276 | A1 | 10/2002 | Le Guin |
| 2003/0015653 | A1 | 1/2003 | Hansma |
| 2004/0165191 | A1 | 8/2004 | Breider |
| 2008/0024793 | A1 | 1/2008 | Gladnick |
| 2008/0052936 | A1 | 3/2008 | Briggs |
| 2009/0082986 | A1 | 3/2009 | Pettersson |
| 2009/0165317 | A1 | 7/2009 | Little |
| 2010/0312524 | A1 | 12/2010 | Siercks |
| 2011/0037987 | A1 | 2/2011 | Gurny |
| 2011/0080588 | A1 | 4/2011 | Segall |
| 2011/0229091 | A1 | 9/2011 | Jensen |
| 2011/0258868 | A1 | 10/2011 | Jordil |
| 2012/0050723 | A1 | 3/2012 | Emtman |
| 2012/0110866 | A2 | 5/2012 | Jensen |
| 2013/0097882 | A1* | 4/2013 | Bridges et al. .................. 33/503 |
| 2013/0163006 | A1 | 6/2013 | Sesko |
| 2013/0222815 | A1 | 8/2013 | Patzwald |

OTHER PUBLICATIONS

"Confocal Chromatic Displacement Sensors," Micro-Epsilon Messtechnik GmbH & Co. KG, Ortenburg, Germany, [n.d.], 12-page brochure.

Extended European Search Report dated Aug. 21, 2013, issued in corresponding Application EP 13 16 9331.9, filed May 27, 2013, 6 pages.

Extended European Search Report dated Aug. 26, 2013, issued in corresponding Application EP 13 16 9336.8, filed May 27, 2013, 6 pages.

Jones, B.K., et al., "Interchangeable Chromatic Range Sensor Probe for a Coordinate Measuring Machine," U.S. Appl. No. 13/481,734, filed May 25, 2012.

Jones, B.K., et al., "Interchangeable Optics Configuration for a Chromatic Range Sensor Optical Pen," U.S. Appl. No. 13/542,144, filed Jul. 5, 2012.

"Non-Contact 3D Measurement Systems," STIL E-Catalog, E1010, STIL S.A., Aix en Provence, France, [n.d.], pp. 44-49.

"Non-Contact <<Point>> Sensors," STIL E-Catalog, E1104, STIL S.A., Aix en Provence, France, [n.d.], pp. 4-27.

* cited by examiner

CHROMATIC RANGE SENSOR PROBE DETACHMENT SENSOR

FIELD

The present application relates generally to precision measurement instruments, and more particularly to detachment sensing methods such as may be used in conjunction with a chromatic range sensor probe system for a coordinate measuring machine.

BACKGROUND

In various types of coordinate measuring machines, the points on the surface of a workpiece may be sensed with a probe. In one type of probe, the workpiece is directly measured by touching a mechanical contact of the probe to various points along the workpiece surface. In some cases, the mechanical contact is a ball. Certain coordinate measuring machines use both optical and mechanical measuring sensors. Such devices are described in U.S. Pat. Nos. 4,908,951 and 5,825,666, which are hereby incorporated by reference in their entirety. Auto changing racks are also disclosed for holding multiple probes, a probe holder, and lenses for selective mounting on a camera, and the like.

Related to auto changing racks, frequently interchangeable measuring probes are attached to coordinate measuring machines at an auto exchange joint connection included in various "probe heads". At present, Renishaw probes heads are the most commonly used for certain applications in the industry. These probes heads are manufactured by Renishaw-Metrology Limited in Gloucestershire, United Kingdom. While Renishaw™ type probe head systems are the most commonly used in the industry, certain technologies are not easily incorporated into Renishaw-type systems. Furthermore, attempts to upgrade an existing Renishaw-type probe head system to one with more advanced capabilities can entail significant costs and/or inconvenience. For example, certain technologies adapted to a Renishaw-type probe head system may lack desirable features, lack a desirable level of controllability, and/or lack the capacity for being automatically interchangeable with other types of probes that may be interfaced to the Renishaw-type probe head system. One particular issue with regard to using Renishaw-type probe head systems, or similar systems, is that the existing data and control connections between the machines and the probes consist of a limited number of wired connections. This effectively forms a "bottleneck" which makes it difficult to add additional technologies and/or features to a probe that is to be mounted and/or exchanged using the probe head system. In particular, existing chromatic range sensors have not typically been automatically attachable and/or interchangeable using a Renishaw-type probe head system or the like.

One issue for measuring probes is the danger of a collision with a workpiece. During measurement operations, a measuring probe may be moved by a coordinate measuring machine to different physical locations for measuring a workpiece surface. During such movements, a collision may accidentally occur between the measuring probe and the workpiece or other physical object. Such collisions may cause damage to the probe, the coordinate measuring machine, and/or the workpiece. It would be desirable if a chromatic range sensor probe could provide a capability for sensing a detachment condition of a portion of its optical pen in the event of a collision, for example while utilizing a Renishaw-type probe head system or the like, and/or optical pen components that would be automatically attachable and/or interchangeable to an optical pen base member while on a coordinate measuring machine, for example, by using an auto changing rack.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method for a chromatic range sensor probe detachment sensor is provided. In accordance with one aspect, the system includes an optical pen for use in a chromatic range sensor (CRS) system that provides workpiece measurement information in a coordinate measuring machine. The optical pen includes an interchangeable optics element and an optical pen base member that is fixed relative to a moving portion of the coordinate measuring machine. The optical pen base member receives the interchangeable optics element and holds it in a fixed relationship relative to the base member. In accordance with the methods disclosed herein, the interchangeable optics element includes a detachment signal element. The detachment signal element is configured to substantially transmit a first set of wavelengths corresponding to a measuring range of the chromatic range sensor system, and at least partially reflect a set of detachment signal element wavelengths.

In accordance with another aspect, the set of detachment signal element wavelengths may not be included in the first set of wavelengths corresponding to a measuring range. The detachment signal element wavelengths may be shorter than the measuring range wavelengths. The set of detachment signal element wavelengths may be detected by a set of detachment signal element wavelength sensing pixels that is not included in a set of pixels that sense the wavelengths corresponding to the measuring range. In one implementation, the first set of wavelengths corresponding to a measuring range may be detected by a wavelength detector that is also utilized to detect the set of detachment signal element wavelengths. In one implementation, the set of detachment signal element wavelengths may overlap the measuring range wavelengths.

In accordance with another aspect, the detachment signal element may be configured to substantially reflect the set of detachment signal element wavelengths. In various implementations, the detachment signal element may comprise a component such as a low pass reflector filter, a high pass reflective edge filter, a bandpass reflective filter, etc.

In accordance with another aspect, the set of detachment signal element wavelengths may be deflected to follow a path different than the set of measuring range wavelengths in a detector portion of the chromatic range sensor. For example, the set of detachment signal element wavelengths may be directed to a dedicated detachment signal element sensor. In another example, the set of detachment signal element wavelengths may be directed to a set of detachment signal pixels in a wavelength detector of the chromatic range sensor, which is used for sensing signals in the set of detachment signal element wavelengths.

In accordance with another aspect, the detachment signal element signal contributions may be compensated, such that a compensated set of output signals from the system do not exhibit a peak at the set of detachment signal element wavelengths when the interchangeable optics element is attached to the optical pen. In such a configuration, the compensated set of output signals from the system may exhibit a valley at the set of detachment signal element wavelengths when the interchangeable optics element is detached.

In accordance with another aspect, the detachment signal element signal contributions may not be compensated as part of an optical pen compensation, such that a compensated set of output signals from the system exhibit a peak at the set of detachment signal element wavelengths when the interchangeable optics element is attached. In such a configuration, the compensated set of output signals from the system may not exhibit a peak at the set of detachment signal element wavelengths when the interchangeable optics element is detached.

In accordance with another aspect, the detachment signal element may comprise a substrate less than 1 mm thick. In one implementation, the detachment signal element may comprise a thin film reflective filter. The thin film may be applied to an optical element comprising at least one of a lens, a beamsplitter, and a sealing window. The thin film reflective filter may reflect light at a band of wavelengths that is outside of a wavelength range corresponding to the normal measurement range of the chromatic range sensor system.

In accordance with another aspect, the detachment signal element may be positioned proximate to the confocal aperture and/or where the source light is substantially focused and/or where the source light is substantially collimated.

In accordance with another aspect, the change in signal that occurs when the interchangeable optics element is detached may be utilized for detecting a detachment condition. In one implementation, the detection of the detachment condition may be utilized to prevent damage due to a collision with a workpiece. More specifically, as the coordinate measuring machine moves the chromatic range sensor probe, which includes the optical pen, to different positions during inspection operations, there is a danger that a collision with a workpiece or other object may occur. In the event of a collision where the interchangeable optics portion becomes detached, a signal may be sent to the coordinate measuring machine to cause it to immediately stop movement so as to minimize any damage. It will be appreciated that by utilizing the existing chromatic sensor components for detecting the detachment condition, such functions can be implemented without requiring any additional sensors or wiring to be added to the chromatic range sensor or probe. Thus, an existing attachment utilizing a Renishaw or other type of probe head system may continue to be utilized.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
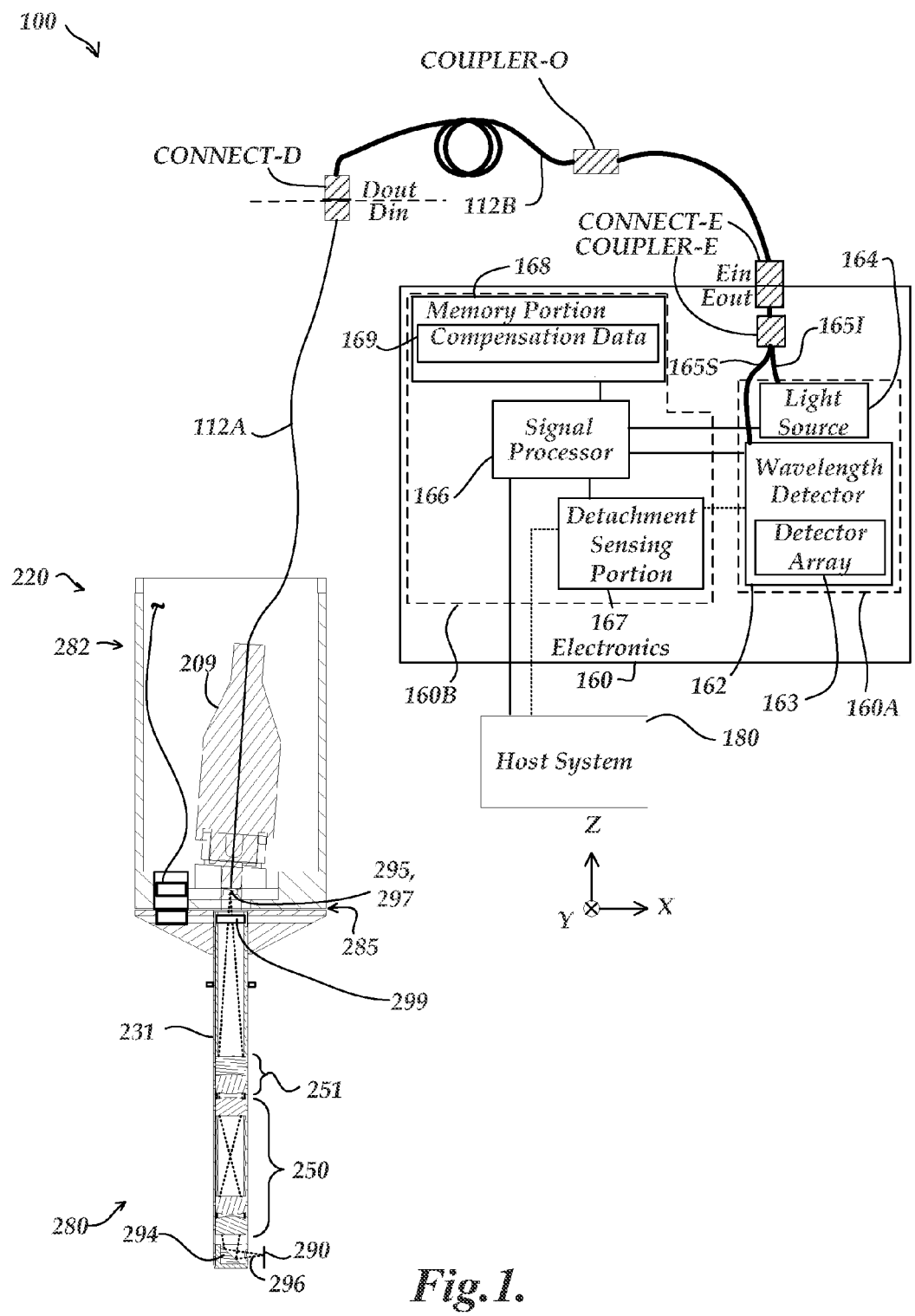
FIG. 1 is a block diagram of an exemplary chromatic range sensor (CRS) system including an optical pen with an interchangeable optics element having a detachment signal element.

FIG. 1 is a block diagram of an exemplary chromatic range sensor (CRS) system 100 of a first type based on operating principles that are desirable to employ in conjunction with a coordinate measuring machine (CMM). The CRS system 100 has certain similarities to sensors described in U.S. Pat. Nos. 7,876,456 and 7,990,522 (the '456 and '522 patents, respectively), which are hereby incorporated herein by reference in their entireties. As shown in FIG. 1, the CRS system 100 includes an electronics portion 160 and an optical pen 220. It will be appreciated that the CRS system 100 shown in FIG. 1 is a chromatic point sensor system which measures a single measurement point at a time. The optical pen 220 shown in FIG. 1 is an optical pen. However, in various embodiments alternative types of chromatic range systems, such as a chromatic line sensor, may be configured to operate according to the systems and methods disclosed herein. The optical pen 220 is described in more detail in U.S. patent application Ser. Nos. 13/542,144 and 13/481,734, which are hereby incorporated herein by reference in their entireties.

In the embodiment shown in FIG. 1, the electronics portion 160 includes a wavelength detector 162, a broadband light source 164, a signal processor 166, a detachment sensing portion 167, and a memory portion 168. In various embodiments, the wavelength detector 162 includes a detector array 163 of a spectrometer. The detector array 163 may comprise a plurality of pixels distributed along a measurement axis of the wavelength detector 162, the plurality of pixels receiving respective wavelengths and providing output spectral profile data. In various embodiments, the memory portion 168 includes compensation data 169.

As will be described in more detail below, the detachment sensing portion 167 is utilized in accordance with methods described herein to detect a detachment condition with respect to an interchangeable optics element 280 of the optical pen 220. In various implementations, the detachment sensing portion 167 may have elements or functions merged with the signal processor 166, and/or may have a separate detector in the area of the detector array 163. During measurement operations, when the detachment sensing portion 167 detects a detachment condition, a detachment warning signal may be provided. For example, the sudden detachment of the interchangeable optics element 280 may indicate a collision with a workpiece. In order to minimize damage to the optical pen 220 and a CRS probe to which it may be attached, when a detachment condition is detected a coordinate measuring machine that is moving the probe may be instructed to come to an immediate stop. The detection of the detachment condition may also be utilized to halt any measurement operations that are currently occurring, and for providing a notification to the user that the interchangeable optics element 280 will need to be reattached before further measurement operations can be performed.

As disclosed in more detail below with respect to FIGS. 2 and 3, and as described in more detail in the previously incorporated '144 and '734 applications, certain components of the electronics portion 160 may in some implementations be included within a CRS probe assembly that is mated to a CMM through an autojoint connector. For example, in one implementation, a group of components in a light source and wavelength detector portion 160A (e.g., including the wavelength detector 162 and light source 164) may be included inside a CRS probe assembly. A group of components in a measurement signal processing and control circuit 160B (e.g., including the signal processor 166 and memory portion 168) may be located remotely outside of the CRS probe assembly, if desired (e.g., to maintain low probe weight and compact probe size). As noted above, various components or functions of the detachment sensing portion 167 may be included in either the light source and wavelength detector portion 160A or the measurement signal processing and control circuit 160B, depending on the components and configuration of the particular implementation.

As shown in FIG. 1, in some embodiments, the electronics portion 160 may be connected to a host system 180 that may receive and/or exchange control signals and data with the CRS electronics 160. It will be appreciated that in various embodiments the operations of the systems and methods disclosed herein may be performed in either the CRS electronics 160 or the host system 180. In one embodiment, the host system 180 may include automatic motion control (e.g., as in a machine vision inspection system, etc.) and may define and execute part programs that operate the CRS system 100 in the role of a non-contact measurement probe to perform inspection operations.

The electronics portion 160 is coupled to the optical pen 220 through an optical path including a fiber optic cable 112. In the embodiment shown in FIG. 1, optional or alternative aspects of the optical path are shown, including the fiber optic cable 112 having first and second segments 112A and 112B joined at a connector CONNECT-D in the fiber optic segment 112B, and a coupler COUPLER-O that joins the segment 112B to the electronics portion 160. The light source 164 is connected to input a spectral profile of wavelengths to the fiber optic cable 112.

The optical pen 220 includes a base member 282 and an interchangeable optics element 280, which are coupled together by an exemplary repeatable fast exchange mount 285. The base member 282 includes a fiber optic connector 209 which holds an optical fiber 112A, the end of which outputs an output beam through an aperture 295, and receives reflected measurement signal light through the aperture 295. In various implementations, the aperture 295 may be located within the base member 282 or the interchangeable optics element 280. The interchangeable optics element 280 includes a detachment signal element 299, a transfer lens assembly 251, and an optics portion 250. As will be described in more detail below, the detachment signal element 299 at least partially reflects a set of detachment signal element wavelengths that are returned back through the optical fiber 112A. The detachment signal element 299 also substantially transmits a set of measuring wavelengths corresponding to the measuring range of the chromatic range sensor system. More specific details regarding additional components of the optical pen 220 in various embodiments will be described in more detail below with respect to FIG. 5, and are also described in the previously incorporated '144 and '734 applications.

In the embodiment shown in FIG. 1, for measurement operations light comprising the measurement wavelengths is emitted from the end of the optical fiber 112A through the aperture 295, and then passes through the transfer lens assembly 251 and is focused by the optics portion 250 and is directed by a reflective element 294 towards a measurement surface 290. The optics portion 250 provides an axial chromatic dispersion such that the focal point along an optical axis is at different distances depending on the wavelength of the light, as is known for CRS systems. Upon reflection from the measurement surface 290, the light is refocused by the optics portion 250 through the transfer lens assembly 251 onto the aperture 295. Due to the axial chromatic dispersion provided by the optics portion 250, only one wavelength will have the focus distance that matches the measurement distance "Z," which is the distance from a reference position that is fixed relative to the optical pen 220 to the measurement surface 290. The CRS system 100 is configured such that the wavelength that is best focused at the measurement surface 290 will also be the wavelength that is best focused at the aperture 295. The aperture 295 spatially filters the reflected light such that predominantly the best focused wavelength passes through the aperture 295 and into the core of the optical fiber 112A. As will be described in more detail below, the optical fiber 112A routes the measurement wavelength signal light to a wavelength detector 162 that is utilized for determining the wavelength of the measurement wavelength signal light having the dominant intensity, which corresponds to the measurement distance Z to the surface location 290.

During normal measurement operations, the broadband light source 164, which is controlled by the signal processor 166, is coupled to the CRS optical pen 220 through a fiber optic path including the illumination fiber segment 165I, the 2×1 coupler COUPLER-E, CONNECT-E, and the optical fiber 112A. As described above, the wavelengths of light corresponding to the measuring range are substantially transmitted by the detachment signal element 299 and travel through the optical pen 220 to the measurement surface 290. The wavelength of reflected measurement light that is most efficiently transmitted back through the optical pen 220 and the aperture 295 into the optical fiber 112A is the wavelength that is in focus on the measurement surface 290. The reflected measurement light passes back through the fiber optic path to the electronics portion 160 and the coupler COUPLER-E so that approximately 50% of the light is directed through the signal fiber segment 165S to the wavelength detector 162. The wavelength detector 162 receives the light intensity, converts it to an output spectral intensity profile (also referred to simply as an output spectral profile) distributed over an array of pixels along a measuring axis within the measurement range of the detector array 163, and operates to provide corresponding output spectral profile data based on pixel data output from the detector array 163. With regard to the detachment signal element wavelengths, as will be described in more detail below with respect to FIGS. 8-10, in one implementation, a specific range of pixels within the detector array 163 may be utilized for detecting the wavelengths of the detachment signal element light that is reflected back through the optical fiber 112A and follow a similar path as the wavelengths of the reflected measurement light until the wavelengths are separated in the wavelength detector 162. Alternatively, a separate detector (e.g., a separate detector array or other photo sensor) may be provided for detecting the detachment signal element wavelengths, for which the detachment signal element wavelengths may be further filtered or otherwise separated from the measurement light wavelengths and/or directed toward the separate detachment signal element wavelength detector according to known methods.

Figure 9:
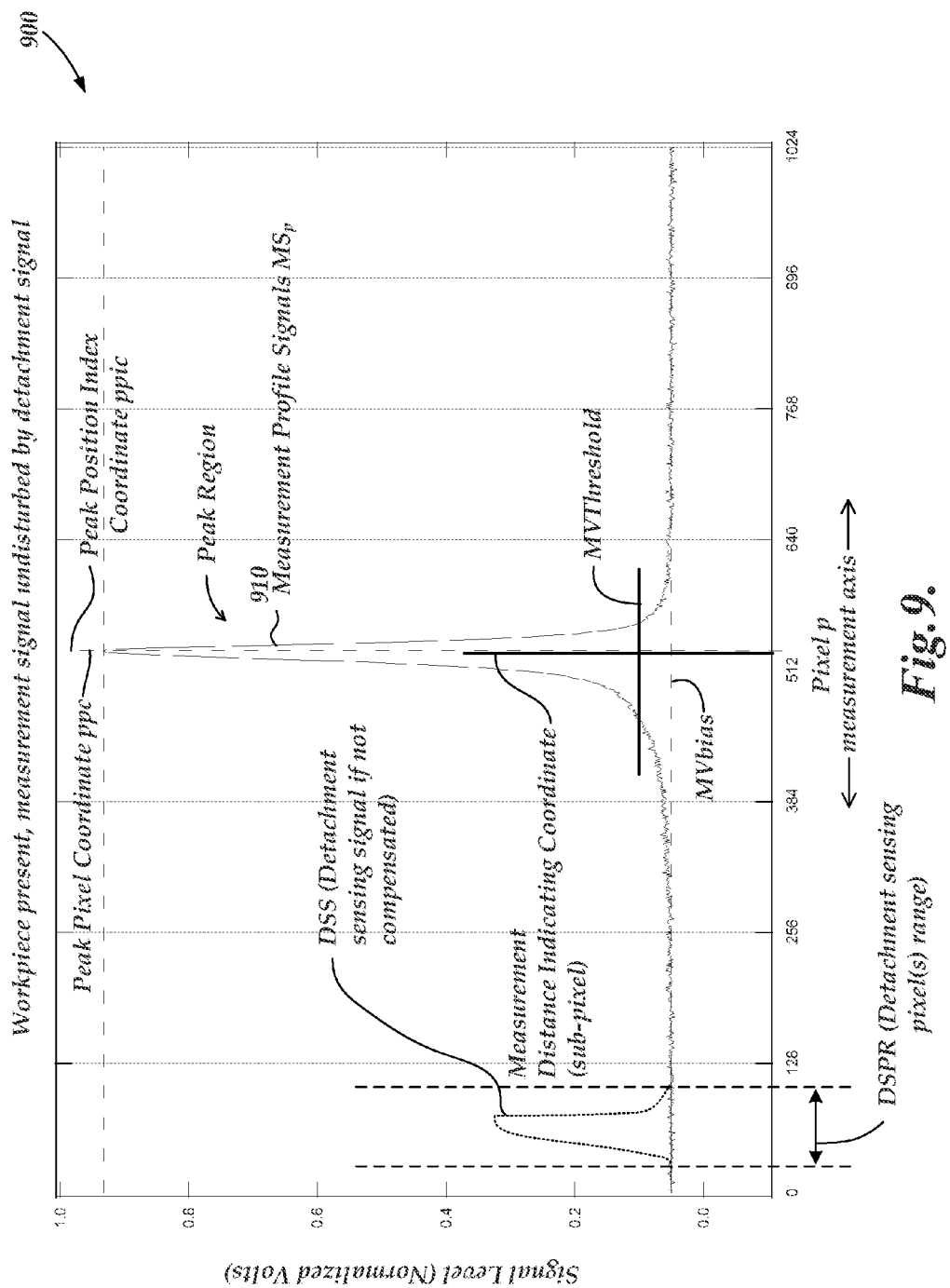
FIG. 9 is a diagram of profile data from a chromatic point sensor illustrating a peak region signal corresponding to a measurement distance indicating coordinate and a signal corresponding to a detachment signal element.

For the reflected measurement light wavelengths (also referred to simply as the measurement wavelengths), in one implementation, a subpixel-resolution distance indicating coordinate (DIC) corresponding to the peak of the wavelength profile data output from the wavelength detector may be calculated by the signal processor 166 and the DIC may determine the measurement distance Z to the surface location 290 via a distance calibration lookup table or the like, which is stored in the memory portion 168, as will be described in more detail below with respect to FIG. 9. The distance indicating coordinate may be determined by various methods (e.g., by determining the centroid of profile data included in a peak region of the profile data). For the detachment signal element wavelengths, in one implementation, the signal processor 166 and/or detachment sensing portion 167 may be utilized for monitoring changes in output at the detachment signal element wavelengths for detecting a detachment condition, as will be described in more detail below.

FIG. 1 includes orthogonal XYZ coordinate axes as a frame of reference. The Z direction is defined to be parallel to the optical axis, or distance-measuring axis, of the optical pen 220. Other exemplary features and operations of the CRS system 100 will be described in more detail below.

Figure 2:
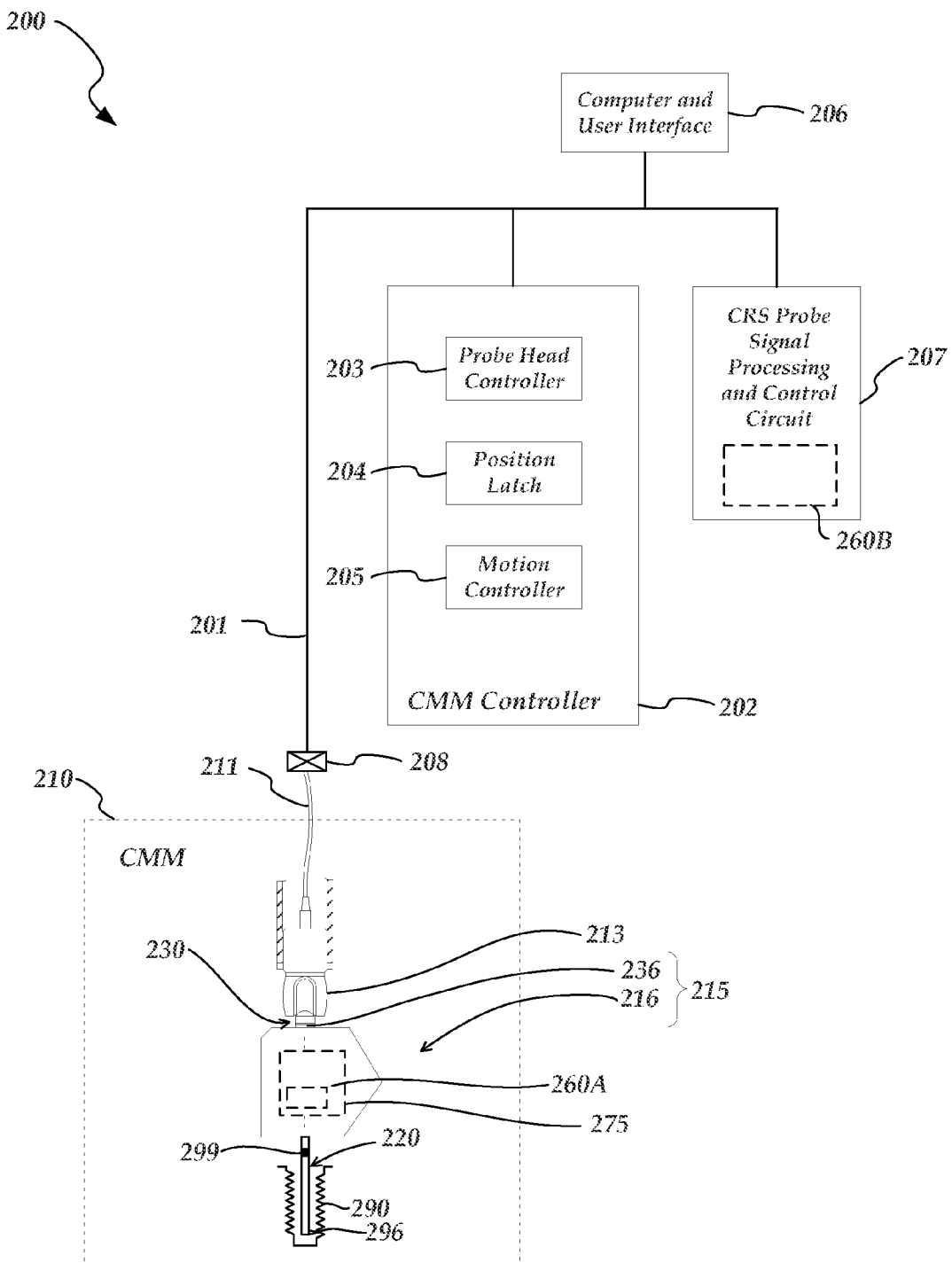
FIG. 2 is a block diagram of a coordinate measurement system including a coordinate measurement machine, a CRS probe including an optical pen with an interchangeable optics element having a detachment signal element, controllers and a user interface.

FIG. 2 is a diagram of a coordinate measurement system 200, and an automatically connectable and interchangeable CRS probe system 215. That is, the CRS probe system 215 may be automatically interchanged with other types of coordinate measurement machine (CMM) probes. A CRS probe system may also be referred to simply as a CRS probe herein. In various drawings herein, unless otherwise indicated by description or context, reference numbers having similar suffixes (e.g., reference number 1XX and 2XX having the suffix XX) may refer to generally analogous elements, such that operation of element 2XX may be generally understood by one of ordinary skill in the art with limited description, based on analogy to a previous description of analogous element 1XX, and so on. However, it will be understood that despite such analogy, various elements may have different implementations in different embodiments, as will be apparent to one of ordinary skill in the art, and are not limited to be identical.

The coordinate measurement system 200 includes a coordinate measurement machine controller 202, a computer and user interface 206, a probe signal processing and control circuit 207, and a coordinate measurement machine 210. The controller 202 includes a probe head controller 203, a position latch 204, and a motion controller 205. The CRS probe 215 includes an auto exchange joint element 236, and is connected to the coordinate measurement machine 210 through a mating joint element in the probe autojoint connection 230 (also referred to as an auto exchange joint connection).

Those skilled in the art will appreciate that the computer and user interface 206 may generally consist of any computing system or device. Suitable computing systems or devices may include personal computers, server computers, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The coordinate measurement machine 210 communicates with all of the other components through a data transfer line 201 (e.g., a bus), which is connected by a connector 208 (e.g., a "micro-D" "micro-D"-type connector) to a probe head cable 211 which provides signals to and from the CRS probe 215. The coordinate measurement machine 210 is controlled by the coordinate measurement machine controller 202, while the CRS probe 215 exchanges data with, and is controlled by, the probe signal processing and control circuit 207 (e.g., in one embodiment, a probe signal processing and control circuit including measurement signal processing and control elements 260B, as outlined above with reference to the element 160B in FIG. 1). The user may control all of the components through the computer and user interface 206.

As described in more detail below with respect to FIG. 3, the CRS probe 215 includes a probe electronics 275 that includes a light source and wavelength detector portion 260A (e.g., in one embodiment, a light source and wavelength detector as outlined above with reference to the element 160A in FIG. 1), and an optical pen 220, which directs a measurement beam 296 toward a measurement surface 290. In one specific example implementation, the measurement surface 290 may comprise an internal surface of a threaded hole.

With regard to the detachment sensing portion 167 of FIG. 1, as noted above in various implementations it may operate in conjunction with, or have various components merged in with the signal processor 166. In such an implementation, in the embodiment of FIG. 2, the detachment sensing portion 167 or relevant components thereof may be included within the signal processing and control elements 260B. Also, in an implementation where the detachment sensing portion 167 has separate components included with or as part of the wavelength detector 162 or detector array 163, then those components may be included in the light source and wavelength detector portion 260A of FIG. 2.

Figure 3:
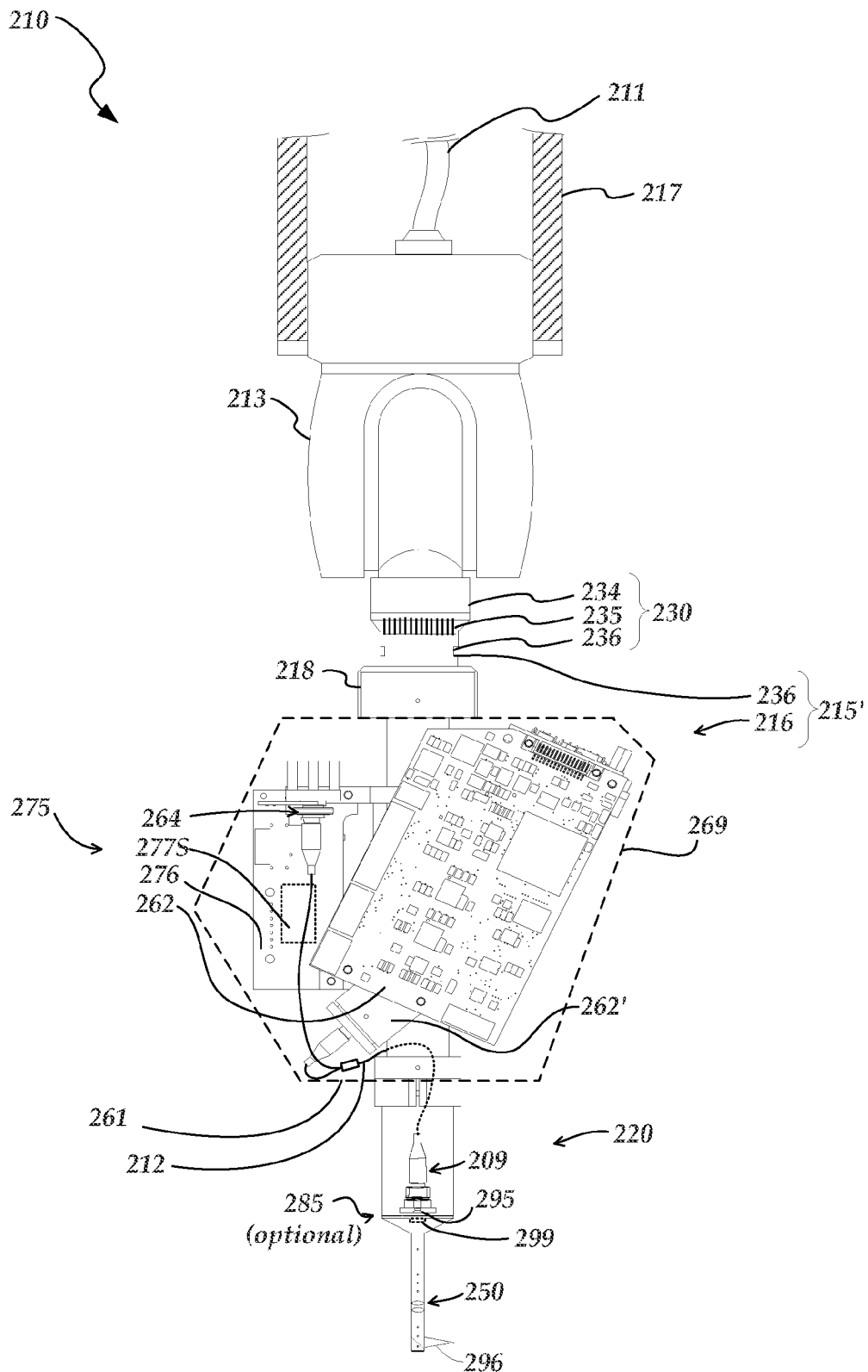
FIG. 3 is a diagram illustrating the internal components of a first exemplary embodiment of the CRS probe of FIG. 2 including an optical pen with an interchangeable optics element having a detachment signal element.

FIG. 3 is a diagram schematically illustrating certain components of the coordinate measurement machine 210 and one exemplary embodiment of a CRS probe 215', which is similar to the CRS probe 215 of FIG. 2. As shown in FIG. 3, the coordinate measuring machine 210 includes a probe head 213. The probe head 213 receives and transmits probe signals through the probe head cable 211. The probe head 213 is secured to a coordinate measurement machine quill 217. The probe head 213 is connected to the probe 215' at a probe autojoint connection 230, as described in more detail in the previously incorporated '144 and '734 applications.

The probe head 213 in some embodiments rotates 360 degrees in a horizontal plane and contains a type of U-joint. The probe autojoint connection 230 is an electro-mechanical connection that fastens the probe head 213 rigidly and mechanically to the CRS probe 215', in a way such that it can be disconnected from one probe and attached to another. In one embodiment, the probe autojoint connection 230 may include first and second mating auto exchange joint elements 234 and 236, wherein the first auto exchange joint element 234 is mounted to the probe head 213, and the second mating auto exchange joint element 236 is mounted to the CRS probe 215'. In one embodiment, the probe autojoint connection 230 has mating electrical contacts or connections 235 so that when a probe is attached, the contacts automatically engage and make electrical connections. In some embodiments, this connection method can cause the system to have a relatively high amount of signal noise, which, as will be described in more detail below, makes it advantageous to use certain configurations and methods that can function effectively in a relatively noisy environment.

The CRS probe 215' receives its power and control signals through the autojoint connection 230. The signals passed to the CRS probe 215' through the autojoint connection 230 are passed through connections 235. As shown in FIG. 3, the CRS probe 215' includes auto exchange joint element 236 and a probe assembly 216 that is mounted to the auto exchange joint element 236, for automatic connection to the CMM through the probe autojoint connection 230. The probe 215' may also include a protective cover or housing 269 (schematically illustrated). The probe assembly 216 comprises an optical pen 220, and probe electronics 275 which may comprise an electrically powered light source 264 and a wavelength detector 262, all supported by various structural members. In the embodiment shown in FIG. 3, the structural members extend from a base 218 that is attached to the auto exchange joint element 236.

As described above with respect to FIG. 1, the optical pen 220 may include a fiber optic connector 209, a detachment signal element 299 and a confocal optical path including an aperture 295 and a chromatically dispersive optics portion 250, which outputs a measurement beam 296. In some embodiments, the optical pen 220 may include a repeatable fast exchange mount 285 that allows replacement of the chromatically dispersive optics portion 250, as well as detachment in the event of a collision, as will be described in greater detail below. The electrically powered light source 264 may work in conjunction with known circuits (e.g., as found in commercial chromatic ranging systems) included in a probe power and signal control circuit portion 276 that is included in probe electronics 275, and that receives electrical power transmitted through the auto exchange joint element.

In some embodiments, the probe electronics 275 includes a serializer 277S that allows various data signals to be serialized and communicated through the autojoint connection 230 using relatively few wires to a deserializer (included, for example, in the probe signal processing and control circuit 207), as described in greater detail below. In the embodiment shown in FIG. 3, the serializer 277S is included on the probe power and signal control circuit portion 276. However, in other embodiments, the serializer 277S may be included with the CRS wavelength detector 262, since much of the serialized data to be transmitted is measurement spectral profile data that originates in the CRS wavelength detector 262. More generally, the serializer 277S may be located at any desired location in the probe electronics 275 that provides satisfactory noise and crosstalk characteristics. As noted above, in an embodiment where components of the detachment sensing portion 167 are included in the light source and wavelength detector portion 260A of the probe electronics 275 of FIG. 2, then these components will correspondingly be included within the probe electronics 275 of FIG. 3.

The light source 264 generates light originating in the CRS probe assembly, the light comprising detachment signal element wavelengths and an input spectral profile of measurement wavelengths routed to the optical pen 220 through the fiber optic cable 212. The CRS wavelength detector 262 may comprise known circuits (e.g., as found in commercial chromatic ranging systems) that work in conjunction with a spectrometer arrangement 262' and detector array 263 comprising a plurality of pixels distributed along a measurement axis of the CRS wavelength detector. As described above, the plurality of pixels may receive respective measurement wavelengths reflected into the confocal optical path from the target surface, and detachment signal element wavelengths reflected from the detachment signal element, and provide corresponding output spectral profile data.

It will be appreciated that a configuration such as that outlined above which generates and processes the light used for measurement entirely within the CRS probe assembly allows the CRS probe assembly to be self-contained and automatically exchangeable. In various embodiments, such a CRS probe system does not require or include an optical fiber connection from the CRS probe assembly to an outside element through the autojoint connector, or along any other makeshift path in parallel with the autojoint connector. Stated another way, in various embodiments, such a CRS probe assembly does not connect to or include an optical fiber that extends outside of the CRS probe assembly.

Similarly, in various embodiments, such a CRS probe system does not require or include a connection for detachment sensing circuitry from the CRS probe assembly to an outside element through the autojoint connector, or along any other makeshift path in parallel with the autojoint connector. More specifically, by utilizing the existing or modified internal CRS systems for detecting a detachment condition, additional external circuitry or connections are not required.

Figure 4:
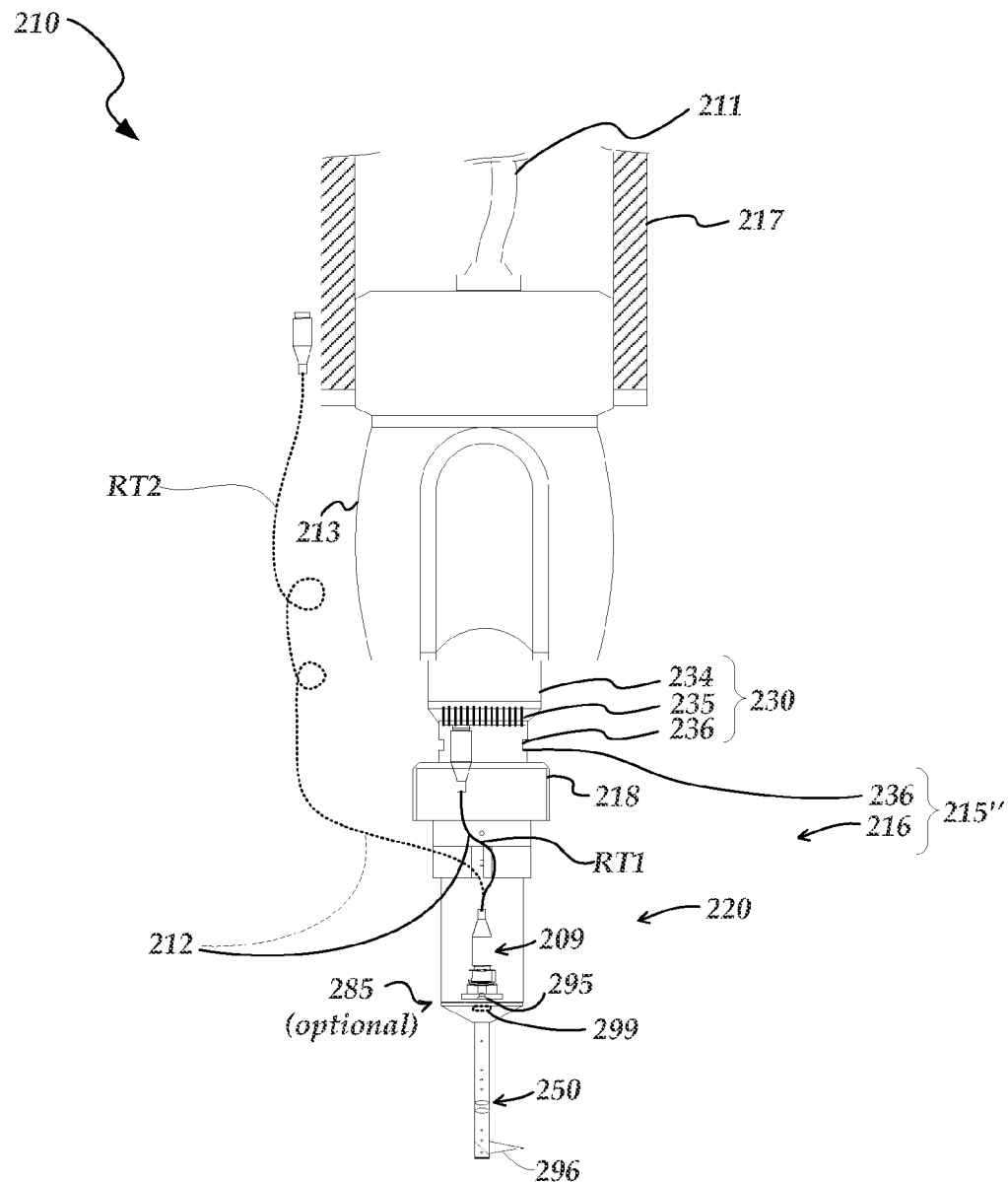
FIG. 4 is a diagram illustrating the internal components of a second exemplary embodiment of a CRS probe including an optical pen with an interchangeable optics element having a detachment signal element.

FIG. 4 is a diagram illustrating certain components of the coordinate measurement machine 210 and a second exemplary embodiment of a CRS probe 215", which is similar to the CRS probe 215 of FIG. 2, including an optical pen 220 with an interchangeable optics element having a detachment signal element 299. The primary difference for the CRS probe 215" of FIG. 4 as compared to the CRS probe 215' of FIG. 3 is the removal of the probe electronics 275 to a remote location. Since the CRS probe 215" of FIG. 4 does not include the probe electronics 275, an optical fiber connection is required, which, in accordance with one implementation, is provided through a first routing path RT1, which is directed through the probe autojoint connection 230. In an alternative implementation, an external routing path RT2 may be utilized, which includes an external routing of the optical fiber 212. In various implementations, the design considerations for utilizing either of the routing paths RT1 or RT2 may depend on factors such as the specific configurations for the probe mounting, machine design, etc. It will be appreciated that because the probe electronics 275 are not included in the embodiment of FIG. 4, that the detachment sensing portion 167 may in one implementation generally be included with reference to FIG. 2 in the block 260B as being part of the CRS probe signal processing and control circuit 207.

Figure 5:
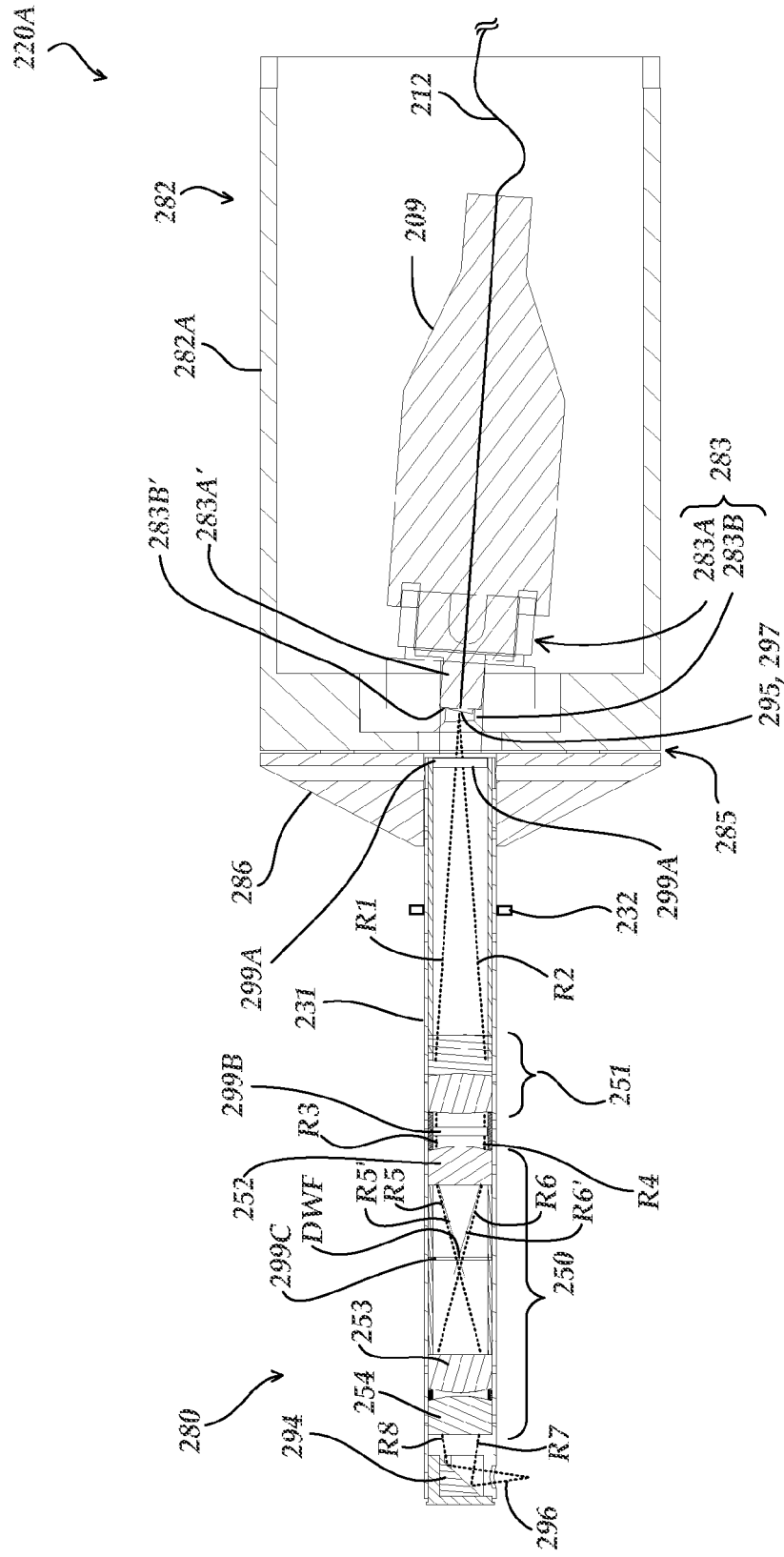
FIG. 5 is a diagram illustrating additional details of the components of an exemplary embodiment of an optical pen similar to the optical pen of FIGS. 3 and 4 and illustrating three potential locations for the detachment signal element.

FIG. 5 is a diagram illustrating the components of an exemplary embodiment of an optical pen 220A similar to the optical pen 220 of FIGS. 1-4 and illustrating three potential locations for a detachment signal element 299A, 229B, or 299C. As shown in FIG. 5, the optical pen 220A includes a base member 282 and an interchangeable optics element 280, which are coupled together by an exemplary repeatable fast exchange mount 285. In this embodiment, the interchangeable optics element 280 includes a front plate 286, tube 231, chromatically dispersive optical portion 250, transfer lens 251, and detachment signal element 299A, 229B, or 299C.

The base member 282 includes a base housing 282A that includes a surface that serves as a first mating half of the repeatable fast exchange mount 285, and the front plate 286 has a corresponding surface that serves as a second mating half of the repeatable fast exchange mount 285. In one embodiment, the second mating half of the repeatable fast exchange mount 285 is forced against the first mating half 285A by a holding force arrangement comprising permanent magnets 285C mounted in one or both of the first and second mating halves 285A or 285B. More generally, the holding force arrangement may comprise known means such as spring-loaded mechanical detents, or the like. In one embodiment, the interchangeable optics element 280 may include a collar 232 or the like that may be guided under program control such that it is inserted between the arms of a mating fork included on a probe rack within the motion volume of a CMM, such that the interchangeable optics element 280 may be automatically removed from the base member 282. It will be appreciated that one advantage of such holding force arrangements is that in the event of a collision with a workpiece, the interchangeable optics element 280 may detach in a way that will minimize damage to the rest of the CRS probe system and/or coordinate measuring machine. As will be described in more detail below, the utilization of the detachment signal element 299A, 229B, or 299C allows such a detachment condition to be detected, for which a signal may be sent to a controlling coordinate measuring machine to immediately halt any further motion.

The base member 282 is configured to hold the optical pen 220A in a stable relationship relative to an external reference frame for measurement. In some embodiments, the base housing 282A may comprise an external mounting surface configured for mounting the base member to an external element that defines the external reference frame (e.g., by clamping or otherwise mounting the base housing 282A to the external element using fasteners or the like). For example, the external element may comprise a fixed element that defines a fixed reference frame (e.g., a mounting stand for the optical pen), or the external element may comprise a CRS probe assembly mounted to a CMM (e.g., as disclosed herein), the CRS probe assembly mounted to the CMM defining an external reference frame comprising a machine coordinate system. In various embodiments, the base member provides the sole support for the interchangeable optics element, and supports the interchangeable optics element in a very stable manner (e.g., with insignificant vibration of the interchangeable optics element in the expected measuring environment). It will be understood that the external mounting features illustrated and described herein are exemplary only and are not limiting. However, the base member and the repeatable fast exchange mount are distinguished from conventional optical fiber connectors that connect optical fibers to known optical pens. For example, such optical fiber connectors are not suitable for repeatably attaching and holding the optical pen in a stable relationship relative to an external reference frame for measurement. They do not provide adequate strength and/or rigidity for providing the sole support for an element holding the optics elements of an optical pen, such as the interchangeable optics element 280 disclosed herein.

In one embodiment, the base member 282 includes the end of an optical fiber 212 that may be located proximate to a confocal aperture 295 that is fixed relative to the first mating half of the repeatable fast exchange mount 285, which may generally surround the confocal aperture 295. In some embodiments, the end of the optical fiber provides the confocal aperture 295. In some embodiments, the confocal aperture 295 is provided by a thin aperture element that is bonded in place proximate to or abutting the end of the optical fiber, or may be provided by a hole fabricated in (or bonded to) an optical fiber end positioning element 283B, as will be described in more detail below.

In various embodiments, an optical pen may comprise an optical fiber end positioning arrangement that locates the end of the optical fiber 212 proximate to an operational position 297 of the confocal aperture 295. In various embodiments, the operational position 297 of the confocal aperture 295 coincides with the position where the lenses of the optical pen nominally focus the measurement light that passes through the optical pen. In the particular embodiment shown in FIG. 5, the optical fiber end positioning arrangement 283 is located entirely in the base member 282 and comprises an optical fiber holding element 283A and an optical fiber end positioning element 283B that are fixed (e.g., bonded) in the base member 282. In this embodiment, the optical fiber holding element 283A may include some compliance in holding or positioning the optical fiber, and the optical fiber end positioning element 283B is configured to stabilize the end of the optical fiber 212 proximate to the operational position 297 of the confocal aperture 295.

For example, in one embodiment, the optical fiber 212 and its end may be fixed in a spring-loaded ferrule 283A' in a known type of optical fiber connector that provides the optical fiber holding element 283A and the optical fiber end positioning element 283B. The optical fiber end positioning element 283B may include a recessed surface 283B' including a light transmission hole, surrounded by a guide for the ferrule (e.g., a hole, a tapered hole, or a chamfered shoulder, or the like). The guide guides the spring-loaded ferrule to the recessed surface 283B', where it abuts the recessed surface 283B' and is stabilized at a desired location defined by that recessed surface (e.g., at or proximate to the operational position 297 of the confocal aperture 295).

In some embodiments, the confocal aperture 295 may consist of the end of the optical fiber 212. Alternatively, the confocal aperture 295 may be an aperture in an aperture element (e.g., a foil or thin film aperture) that is fixed relative to the end of the optical fiber (and/or the ferrule 283A'). In such cases, the optical fiber end positioning element 283B may be configured to stabilize the end of the optical fiber 212 such that the confocal aperture 295 is stabilized proximate to the operational position 297. In other embodiments, the confocal aperture comprises an aperture in an aperture element that is fixed to at least one of the optical pen base member 282 and the optical fiber end positioning element 283B at the operational position (e.g., at the recessed surface 283B'). In such cases, the optical fiber end positioning element 283B is configured to stabilize the end of the optical fiber 212 proximate to the confocal aperture 295.

In some embodiments, the optical fiber holding element 283A may receive and hold the optical fiber sufficiently rigidly relative to the base member, and thereby rigidly locate the end of the optical fiber 212 proximate to the operational position 297 of the confocal aperture 295, such that the separate optical fiber end positioning element 283B may be eliminated.

The interchangeable optics element 280 receives measurement wavelength light from, and returns measurement wavelength light to, the confocal aperture 295, and includes an optical assembly that is fixed relative to the second mating half. The optical assembly includes a chromatically dispersive optical portion 250 that provides axial chromatic dispersion of the measurement wavelength light over a respective measuring range along a measuring axis. In one embodiment, the optical assembly may also include a reflective element 294, which directs the measurement beam laterally to the axis of the optical pen 220A (e.g., laterally relative to the axis of the tube 231). In the embodiment shown in FIG. 5, the chromatically dispersive optical portion 250 includes individual lenses 252, 253, and 254, or the like. In one embodiment, the lenses 252, 253, and 254 are identical and each contributes longitudinal chromatic aberration. In one embodiment, the arrangement shown in FIG. 5 may have an optical path length of approximately 50 mm between the confocal aperture 295 and the mirror element 294. However, it will be understood that this arrangement is exemplary only and is not limiting. Other usable chromatically dispersive lens assemblies are described in U.S. patent application Ser. No. 13/033,565 (the '565 Application), which is hereby incorporated by reference in its entirety, and further below.

The embodiment shown in FIG. 5 further includes the transfer lens 251 (or lens assembly) located between the confocal aperture 295 and the chromatically dispersive optics portion 250 to receive measurement wavelength light from, and focus measurement wavelength light proximate to, the operational position 297 of the confocal aperture 295. Some exemplary confocal rays (or ray segments) are illustrated in FIG. 5. In particular, rays R1 and R2 are shown between a transfer lens 251 and the aperture 295, and rays R3 and R4 are shown between the transfer lens 251 and the chromatically dispersive optical portion 250. The transfer lens 251 may be a collimating or nearly collimating lens in some embodiments, and the rays R3 and R4 are shown to be approximately parallel or approximately collimated, which provides advantages in certain implementations, as will be described in more detail below. Rays R5 and R6 are shown within the chromatically dispersive optical portion 250, and emerge as rays R7 and R8 in the measurement beam 296. It will be appreciated that at the operational position 297 of the confocal aperture is proximate to or at the best focus position of the lens system of the optical pen 220A, and in particular, the focal position of the transfer lens 251, in this particular embodiment.

FIG. 5 also illustrates three potential locations for a detachment signal element 299A, 229B, or 299C. As shown in FIG. 5, the detachment signal element 299A is illustrated in a first location as being in close proximity to the end of the optical fiber 212, and between the aperture 295 and the transfer lens 251. Regarding the configuration of the detachment signal element 299A, at this location the source light may be diverging and, depending on the proximity of the detachment signal element 299A to the confocal aperture 295 and/or the end of the optical fiber 212, the intensity of the beam of wavelengths reflected by the detachment signal element 299A back into the optical fiber 212 may be relatively low. Therefore, to provide a strong detachment signal at this location, it may be advantageous if the detachment signal element 299A is significantly reflective (e.g., highly reflective) and therefore also significantly selective with regard to the wavelengths reflected. One detachment signal element with these characteristics is described in greater detail below with reference to FIG. 11.

Alternatively, the detachment signal element 299B is illustrated in a second location between the transfer lens assembly 251 and the chromatically dispersive optical portion 250. In this location, the detachment signal element 299B may be in the path of the broad approximately collimated beam indicated by the parallel rays R3 and R4 for its reflection of the detachment signal element wavelengths.

Regarding the configuration of the detachment signal element 299B, at this location, the source light may be approximately collimated, and therefore the beam of wavelengths reflected by the detachment signal element 299B may retrace its path such that it may be focused with relatively high intensity back into the optical fiber 212. Therefore, at this location, it will be most advantageous if the detachment signal element 299B is significantly selective with regard to the wavelengths reflected, but it may be sufficient if it is only moderately or even weakly reflective. In some embodiments this may allow the use of an element that is more economical than that described below with reference to FIG. 11.

Alternatively, the detachment signal element 299C is illustrated in a third location within the chromatically dispersive optical portion 250 where the source light includes longitudinal chromatic aberration. As previously indicated, in some embodiments, each of the lenses 252, 253, and 254 may contribute longitudinal chromatic aberration. Thus, as illustrated in FIG. 5, various wavelengths may be focused with an intermediate level of longitudinal chromatic aberration internally to the chromatically dispersive optical portion 250. Regarding the configuration of the detachment signal element 299C, in particular it is located with a reflective surface of the detachment signal element 299C at a detection wavelength focal position DWF where the wavelength (or small band of wavelengths) used for the detachment signal are preferentially focused (e.g., corresponding to the illustrated rays R5' and R6'). In contrast, wavelengths corresponding to the specified measuring range of the chromatic range sensor system are not significantly focused at the detection wavelength focal position DWF. It will be appreciated that as a result, in this configuration the detachment signal element 299C will reflect the focused detachment signal wavelength(s) back along the optical such that they are focused at the confocal aperture 295 and into the optical fiber 212. Due to this efficient focusing, at this location it will be sufficient if the detachment signal element is only weakly reflective (e.g., such as the surface of a transparent glass element). Furthermore, since the detachment signal element 299C may be only weakly reflective, it need not be substantially selective for wavelength in that it may inherently substantially transmit the source light, including the wavelengths corresponding to the measuring range of the chromatic range sensor system. In such embodiments, this may allow the use of a very economical element (e.g., it may comprise the surface of a transparent glass element and need not include a wavelength filter).

Figure 6:
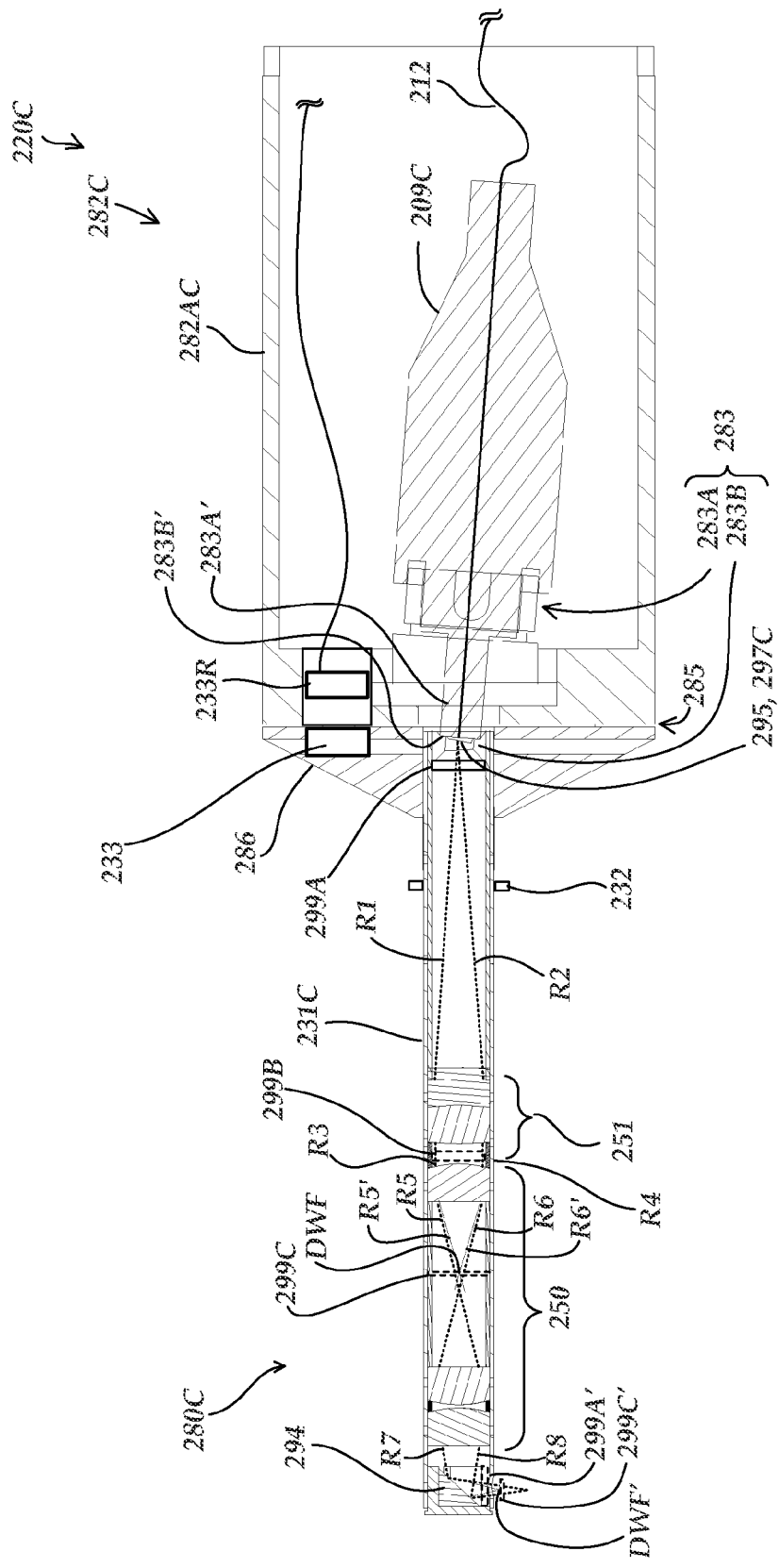
FIG. 6 is a diagram illustrating the components of an exemplary embodiment of an optical pen in which an operational position of the optical pen confocal aperture is located within the interchangeable optics element and illustrating five potential locations for the detachment signal element.

FIG. 6 is a diagram illustrating the components of an exemplary embodiment of an optical pen 220C, which may be similar to the previously described optical pen 220, and illustrating five potential locations for a detachment signal element 299A, 299B, 299C, 229A', or 229C'. In addition, an operational position 297C of the optical pen confocal aperture is illustrated as being located within an interchangeable optics element 280C. As such, in the embodiment shown in FIG. 6, the optical assembly of the interchangeable optics element 280C may include an optical fiber end positioning element 283B analogous to that previously described with reference to FIG. 5. In other words, in the illustrated embodiment, the optical pen 220C may comprise an optical fiber end positioning arrangement 283 that locates the end of the optical fiber 212 proximate to an operational position 297 of the confocal aperture 295 in the interchangeable optics element 280C.

In the particular embodiment shown in FIG. 6, the optical fiber end positioning arrangement 283 is located partially in the base member 282, comprising the optical fiber holding element 283A, and partially in the interchangeable optics element 280C, comprising the optical fiber end positioning element 283B, which may be fixed (e.g., bonded) in the interchangeable optics element 280C. In this embodiment, the optical fiber holding element 283A may include some compliance in holding or positioning the optical fiber, and optical fiber end positioning element 283B is configured to stabilize the end of the optical fiber 212 proximate to the operational position 297 of the confocal aperture 295. For example, in one embodiment, the optical fiber 212 and its end may be fixed in a spring-loaded ferrule 283A' in a type of optical fiber connector that provides the optical fiber holding element 283A and extends beyond the surfaces of the repeatable fast exchange mount 285 and into the interchangeable optics element 280C. The optical fiber end positioning element 283B is adapted for mounting in the interchangeable optics element 280C. The optical fiber end positioning element 283B may include a recessed surface 283B' including a light transmission hole, surrounded by a guide for the ferrule (e.g., a hole, a tapered hole, or a chamfered shoulder, or the like.) The guide guides the spring-loaded ferrule to the recessed surface 283W, where it abuts the recessed surface 283B' and is stabilized at a desired location defined by that recessed surface (e.g., at or proximate to the operational position 297 of the confocal aperture 295).

In some embodiments, the confocal aperture 295 may consist of the end of the optical fiber 212. Alternatively, the confocal aperture 295 may be an aperture in an aperture element (e.g., a foil or thin film aperture) that is fixed relative to the end of the optical fiber (and/or the ferrule 283A'). In such cases, the optical fiber end positioning element 283B may be configured to stabilize the end of the optical fiber 212 such that the confocal aperture 295 is stabilized proximate to the operational position 297. In other embodiments, the confocal aperture comprises an aperture in an aperture element that is fixed to at least one of the interchangeable optics element 280C and the optical fiber end positioning element 283B at the operational position (e.g., at the recessed surface 283W). In such cases, the optical fiber end positioning element 283B is configured to stabilize the end of the optical fiber 212 proximate to the confocal aperture 295. An advantage of locating the optical fiber end positioning element 283B in the interchangeable optics element 280C is that the location of the confocal aperture 295 relative to the other optical elements may be more accurate and repeatable as the interchangeable optics element 280C is removed and reinstalled to the base member 280 because the repeatable fast exchange mount 285 need not affect that relative location.

In one embodiment, the interchangeable optics element 280 may include an ID element 233 (mounted to the front plate 286, for example). A corresponding reader element 233R may be located in the optical pen base member 282. The ID element 233 may be encoded with particular identification information for the interchangeable optics element 280. The ID element 233 may in one embodiment comprise a radio frequency identification device (an RFID element), which may be a passive RFID element. The reader element 233R (e.g., an RFID reader element) is located in close enough proximity to be able to read the data from the ID element 233. In some embodiments, if the reader element 233R is not located adjacent to the ID element 233, a hole may be provided in the base member 282 so that the material of the base member does not obstruct the exchange of signals between the ID element 233 and the reader element 233R (e.g., radio signals, optical signals, an optical image, etc.) In some embodiments, the ID element 233 may comprise an identifying mark (e.g., a simple bar code) or color(s) and the reader element 233R may comprise a photodetector that provides a signal corresponding to the identifying mark or color(s). In some embodiments, the ID element 233 may comprise a passive resonant circuit having an identifying frequency and the reader element 233R may comprise an exciter/detector that provides a signal in response to the identifying frequency.

It will be understood that the embodiment outlined above is exemplary only and is not limiting. In some embodiments where it is desired to have the operational position 297 of the confocal aperture 295 extend into the interchangeable optics element 280C, the optical fiber holding element 283A may receive and hold the optical fiber sufficiently rigidly relative to the base member 280 and the interchangeable optics element 280C when it is retained in position using the repeatable fast exchange mount 285, and thereby rigidly locate the end of the optical fiber 212 proximate to the operational position 297 of the confocal aperture 295 in the interchangeable optics element 280C, such that the separate optical fiber end positioning element 283B may be eliminated.

FIG. 6 also illustrates five potential locations for a detachment signal element 299A, 299B, 299C, 299A', or 299C'. With regard to the configuration of the detachment signal element 299A, it may be similar to the detachment signal element 299A outlined above with reference to FIG. 5, and may be understood by analogy. It will be appreciated that while the location is generally shown to be between the aperture 295 and the transfer lens 251, in various alternative implementations, the location may be between the end of the optical fiber 212 and the aperture 295. For example, as described above, the confocal aperture 295 may comprise an aperture in an aperture element that is fixed to at least one of the interchangeable optics element 280C and the optical fiber end element 283B that is fixed (e.g., bonded) in the interchangeable optics element 280C. In such cases, the detachment signal element 299 (e.g., a thin film coating) may be located between the end of the optical fiber 212 and the aperture 295 (e.g., the thin film coating of the detachment signal element may be located on the inner surface of an aperture element, etc.)

With regard to the configuration of the detachment signal elements 299B and 299C, they may be similar to the detachment signal elements 299B and 299C, respectively, outlined above with reference to FIG. 5, and may be understood by analogy.

With regard to the configuration of the detachment signal element 299A', its location may be anywhere in the vicinity of the distal end of the interchangeable optics portion 280C, (e.g., in a converging portion of the source light), for reflecting the detachment signal element wavelengths along a nearly full path similar to that of the measurement wavelengths to be returned back through the optical fiber 212. Similar to the analogous detachment signal element 299A, at this location the intensity of the beam of wavelengths reflected by the detachment signal element 299A' back into the optical fiber 212 may be relatively low. Therefore, to provide a strong detachment signal at this location it may be advantageous if the detachment signal element 299A' is significantly reflective (e.g., highly reflective) and therefore also significantly selective with regard to the wavelengths reflected. One detachment signal element with these characteristics is described in greater detail below with reference to FIG. 11. In one embodiment, the detachment signal element 299A' may also provide a protective window that seals the optical pen 220C.

With regard to the configuration of the detachment signal element 299C', it may be similar to the detachment signal element 299C outlined above with reference to FIG. 5, and may be understood by analogy. In particular, a reflective surface of the detachment signal element 299C' is located in the vicinity of the distal end of the interchangeable optics portion 280C at a detection wavelength focal position DWF' where the wavelength (or small band of wavelengths) used for the detachment signal is preferentially focused (e.g., adjacent to the measuring range of the optical pen 220C.) In contrast, wavelengths corresponding to the specified measuring range of the chromatic range sensor system are not significantly focused at the detection wavelength focal position DWF'. It will be appreciated that this results in operation analogous to that previously outlined for the detachment signal element 299C shown in FIG. 5, and a similar element may be used (e.g., it may comprise the surface of a transparent glass element and need not include a wavelength filter). The element detachment signal element 299C' may be supported at the proper position using known mechanical techniques, and in one embodiment may also provide a protective window that seals the optical pen 220C.

Figure 7:
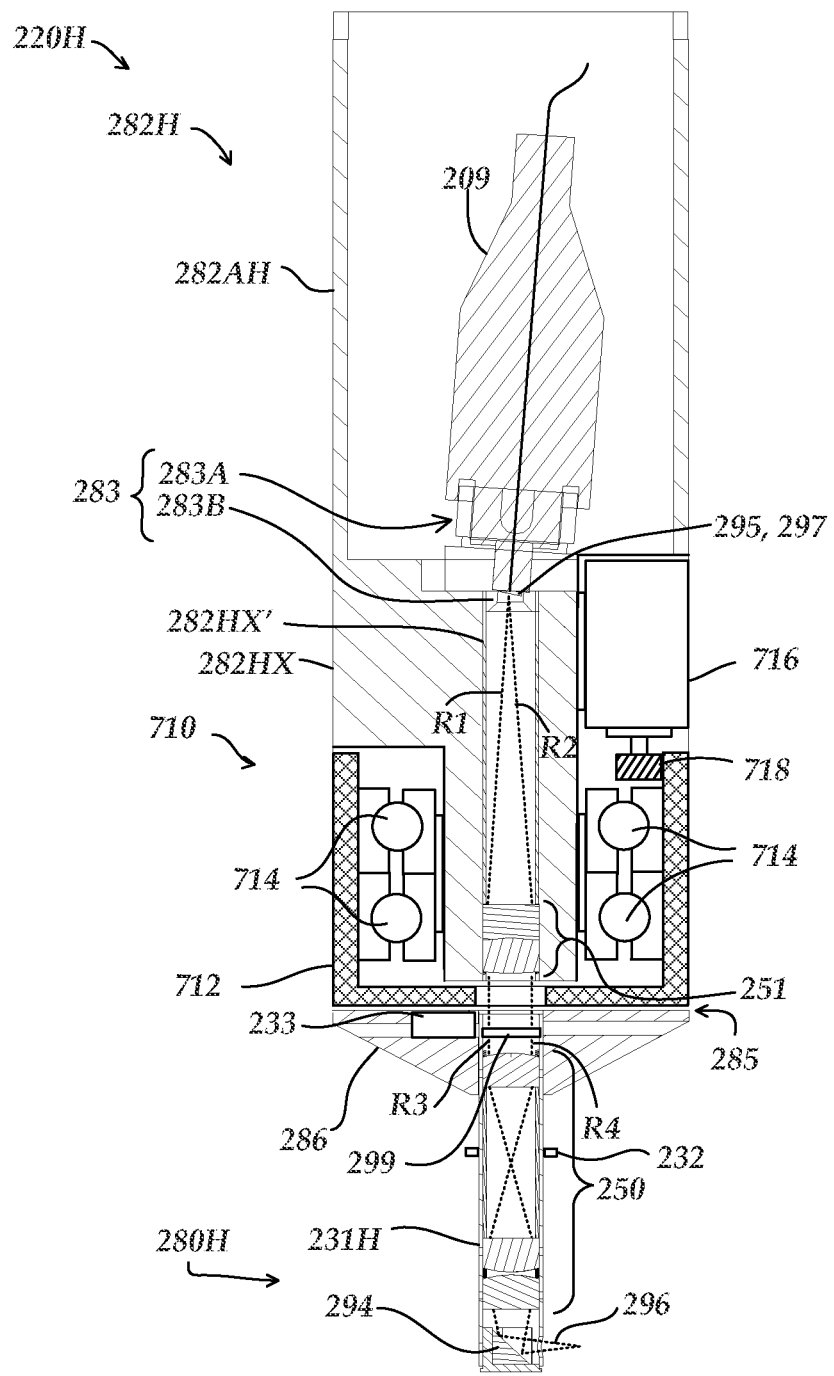
FIG. 7 is a diagram illustrating the components of an exemplary embodiment of an optical pen which includes a rotary portion for rotating an interchangeable optics element having a detachment signal element.

FIG. 7 is a diagram illustrating the components of an exemplary embodiment of an optical pen 220H that includes a rotary element 710 for rotating an interchangeable optics element 280H having a detachment signal element 299. As shown in FIG. 7, the base member 282H is configured to include the components of the rotary element 710. The transfer lens 251 is shown to be located within an extended section 282HX of the base member 282H. The transfer lens 251 may be spaced at the proper distance from the confocal aperture 295 by a tubular section 282HX', or by machined mounting services, or the like. Rays R1 and R2 travel from the transfer lens 251 through the extended section 282HX to a focal point approximately at the operational position 297 where the aperture 295 is located. The approximately parallel rays R3 and R4 from the transfer lens 251 travel through the repeatable fast exchange mount 285 and through a tube 231H to the chromatically dispersive optical portion 250.

As shown in FIG. 7, the rotary element 710 includes a rotating portion 712, which, in this particular embodiment, includes a surface for providing a first mating half of the repeatable fast exchange mount 285. The first mating half is coupled to the second mating half of the fast exchange mount 285 that is located on the front plate 286. The rotary element 710 also includes bearings 714 that allow the rotating portion 712 to rotate, as well as a motor 716 and gears 718 for driving the rotation. Alternative configurations may also be utilized for the motor and rotation actuation (e.g., a motorized sleeve configuration, etc.). In general, the rotation will produce smaller errors/effects when the transfer lens 251 is located in the base member 282H, due to the fact that the optical transmission of the broad collimated beam indicated by the parallel rays R3 and R4 passing through the rotation joint is less sensitive to changing alignment. This configuration also results in the detachment signal element 299 being in the path of the broad collimated beam indicated by the parallel rays R3 and R4, as being located between the transfer lens 251 and the chromatically dispersive optics portion 250. As such, the reflection of the detachment element signal wavelengths will also have smaller errors/effects due to the nature of the broad collimated beam carrying the wavelengths that are being reflected. However, it will be appreciated that this arrangement is exemplary only and is not limiting. Any of the previous configurations of FIGS. 5 and 6 may be altered to include similar components for rotating the interchangeable optics elements, with mirror adaptations that will be apparent based on this disclosure. In some embodiments, for the best calibration and accuracy regardless of the rotation position, the optical pen may be characterized by calibration data that includes unique respective calibration data corresponding to a plurality of respective rotary positions of the interchangeable optics element. Such calibration may compensate for various misalignments that may be a function of the rotation position.

Figure 8:
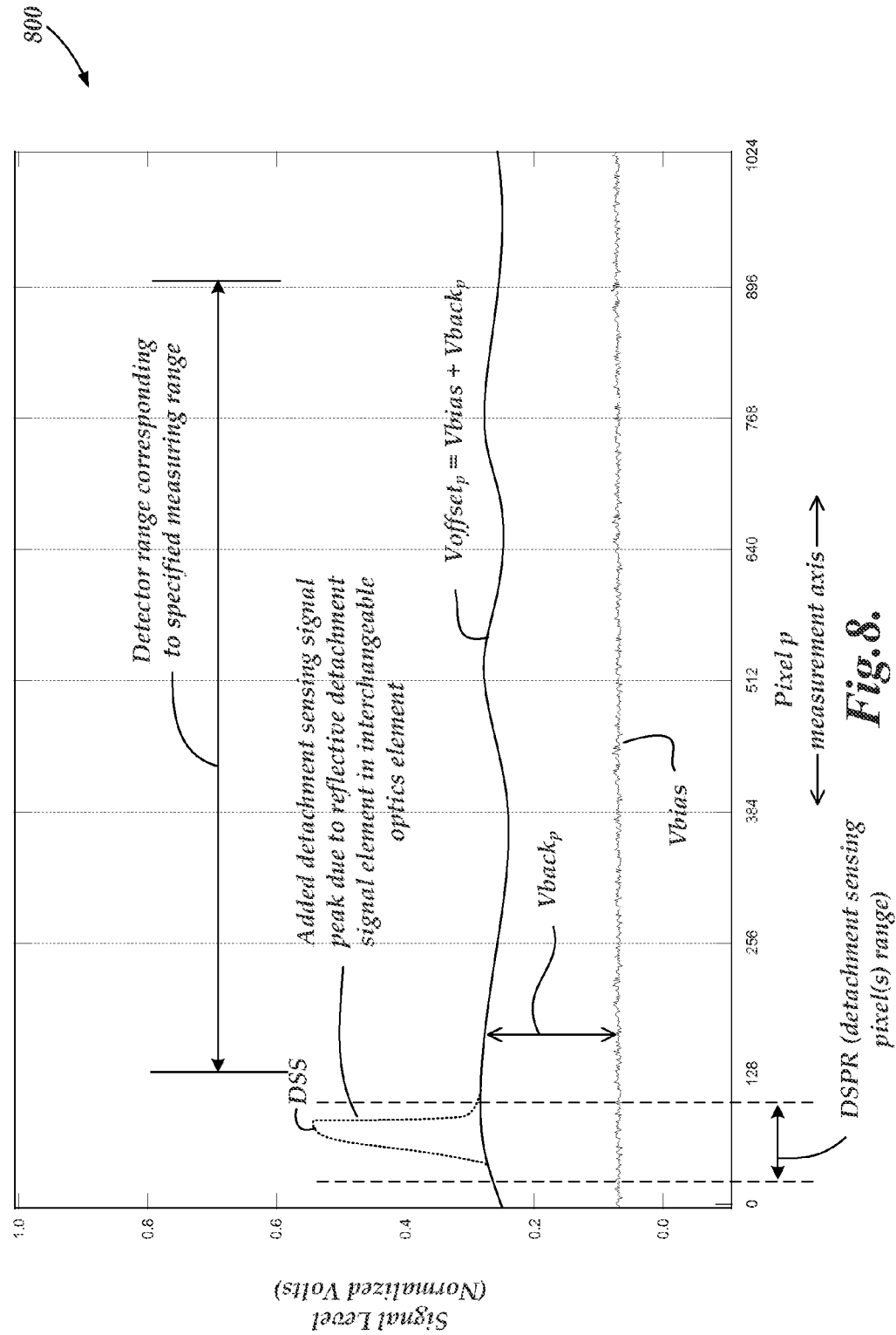
FIG. 8 is a diagram of profile data from a chromatic point sensor illustrating voltage offset signal levels for the pixels in a detector array and a signal corresponding to a detachment signal element.

FIG. 8 is a diagram of a graph 800 of profile data from a chromatic point sensor illustrating voltage offset signal levels Voffset(p) for the pixels in a detector array 163 and an uncompensated detachment sensing signal DSS corresponding to a detachment signal element 299 (e.g., FIG. 1). The profile data illustrates the voltage offset signal levels Voffset(p) when no measurement surface is present (e.g., the measurement workpiece surface 290 of FIGS. 1 and 2 is not present). The voltage offset signal Voffset(p) is plotted in normalized volts for each of 1,024 pixels. "Normalized volts" assigns a value of 1.0 to the saturation voltage of the detector array 163.

The voltage offset signal Voffset(p) includes a bias signal level Vbias, which is shown as unvarying across the array, and a background signal component Vback(p), which is shown as being dependent upon the pixel coordinate p across the array. The variable background signal Vback(p) represents signals such as background light from wavelength-dependent spurious reflections and the like in the chromatic point sensor system fiber path, as well as due to the dark current of the various pixels p. In various embodiments, it is advantageous if the signal components Vback(p) (or signals that show the same variation, such as the voltage offset signals Voffset(p)) are stored for calibration or compensation of the pixel array of the detector array 163, and used to compensate all subsequent profile data signals from each pixel p (e.g., by subtraction), on an ongoing basis. In contrast to the background signal component Vback(p), which may be relatively stable over time, in some implementations the coordinate-independent bias signal level Vbias may change as a result of voltage drifts associated with ambient temperature changes and heat generated by the electronics portion 160 during operation. One exemplary method for compensating for the bias signal level Vbias is described in U.S. Pre-Grant Publication No. 2013/0163006, which is hereby incorporated by reference in its entirety.

The uncompensated detachment sensing signal DSS represents the added signal (e.g., a wavelength peak) that occurs due to the reflective detachment signal element 299 in the interchangeable optics element 280. As described above, the detachment signal element 299 at least partially reflects a set of detachment signal element wavelengths. As illustrated in FIG. 8, the detachment signal element wavelengths, which are sensed by pixels in a detachment sensing pixels range DSPR, produce the uncompensated detachment sensing signal DSS. As illustrated by the location of the detachment sensing pixels range DSPR in the detector array, in this particular implementation the detachment signal element wavelengths generally consist of relatively shorter wavelengths. In certain implementations, the utilization of shorter wavelengths for the detachment signal element wavelengths may be advantageous in that they are less likely to interfere with any measurement signal wavelengths, which may be in a higher range as will be described in more detail below with respect to FIG. 9.

It should be appreciated that in some embodiments, the detachment sensing signal DSS may be stored for calibration or compensation of the pixel array of the detector array 163 along with the voltage offset signal Voffset(p), as outlined above, and the corresponding signal levels may be compensated or "canceled" in all subsequent profile data signals from each corresponding pixel p (e.g., by subtraction), on an ongoing basis. In such a case, when the detachment sensing signal DSS is compensated, then the proper attachment of an interchangeable optics element is indicated by a "near zero" or null signals as the compensated signals associated with the corresponding pixels. Furthermore, in such a case the detachment or absence of an interchangeable optics element is indicated by a corresponding large negative signal level as the compensated signal associated with the corresponding pixels. Conversely, in some embodiments, the detachment sensing signal DSS may be uncompensated. In such a case, when the detachment sensing signal DSS is uncompensated, then the proper attachment of an interchangeable optics element is indicated by a wavelength peak associated with the corresponding pixels, such as the illustrated peak signal DSS. Furthermore, in such a case the detachment or absence of an interchangeable optics element is indicated by a "near zero" or null signal associated with the corresponding pixels. These cases are described further below with reference to FIG. 10.

FIG. 9 is a diagram of a graph 900 of profile data 910 from a chromatic point sensor illustrating a peak region signal corresponding to a measurement distance indicating coordinate and an uncompensated detachment sensing signal DSS. The profile data 910 (e.g., measurement profile signal data) from a CPS detector (e.g., detector 162), may be acquired during CPS measurement operations, either during certain optical pen or overall system calibration operations or during regular measurement operations. The profile data 910 may also be referred to as the profile signals MS(p), where MS(p) is the signal level (shown in normalized volts) associated with each pixel p of a detector array (e.g., the detector array 163). The graph 900 of FIG. 9 is created with a target surface positioned at some distance along the optical axis OA of the optical pen 220, producing the corresponding measurement profile data 910 having the dominant measurement wavelength peak region shown in FIG. 9.

In various embodiments, the wavelengths of the uncompensated detachment sensing signal DSS may be detected and processed with the same components as the measurement wavelengths (e.g., using a set of detachment signal pixels that are a subset of the detector pixels in a wavelength detector of the chromatic range sensor), or may be processed using other components (e.g., being deflected to follow a different path that is directed to a dedicated detachment signal element sensor in the detector portion, etc.) As indicated above, and described further below with respect to FIG. 10, in various embodiments, the detachment sensing signal DSS may be uncompensated or compensated, either with or without other signals (e.g., with the signal Vbak(p) described above with respect to FIG. 8, etc.). If the detachment sensing signal DSS is uncompensated, when the interchangeable optics element is attached, it may provide a wavelength peak in the pixel signals as illustrated by the dashed line detachment sensing signal DSS when the measurement wavelengths produce the measurement wavelength peak region as shown in FIG. 9.

Conversely, if the detachment sensing signal DSS is compensated, when the interchangeable optics element is attached it may provide flat or null compensated pixel signals (e.g., at the level of MVbias), when the measurement wavelengths produce the measurement wavelength peak region as shown in FIG. 9.

Regardless of how the detachment sensing signal DSS is processed, for the measurement wavelengths a distance indicating coordinate (DIC) may be determined based on signals or wavelengths corresponding to a measuring range (i.e., as opposed to the detachment sensing pixel range) of a chromatic range sensor system. More specifically, with regard to such a determination, FIG. 9 shows a bias signal level MVbias (in normalized volts), a peak pixel coordinate ppc, a peak position index coordinate ppic, and a data threshold MVthreshold that defines the lower limit of a distance-indicating subset of the data in the peak region. All "MV" values are in normalized volts. FIG. 9 also shows a distance indicating coordinate (DIC) that is determined based on the distance-indicating subset of the data in the calibration spectral peak region. The data threshold MVthreshold may be an index-specific threshold, MVthreshold(ppic), in some embodiments.

Briefly, in one embodiment, measurement operations for determining a distance indicating coordinate (e.g., a distance indicating coordinate DIC, as described relative to the profile data 910), may include the following:

Position the target surface along the optical axis OA, and capture the resulting profile data 910.

Determine the peak pixel coordinate (that is, the pixel having the highest signal).

Determine the peak position index coordinate ppic, which is the index for storing and retrieving certain calibration data (e.g., index-specific threshold calibration data). This may be the same as the peak pixel coordinate in some embodiments.

Determine the measurement bias signal level MVbias.

Determine the data threshold MVthreshold (e.g., as a percentage of the peak height, or based on index-specific threshold calibration data that corresponds to the current peak position index coordinate ppic).

Determine the distance indicating coordinate DIC with sub-pixel resolution, based on the distance-indicating subset of the data that has a value greater than MVthreshold in the measurement peak region.

For a distance calibration measurement, independently determine the corresponding distance to the target surface with a desired accuracy (e.g., by interferometer), and determine a distance calibration data point in a distance calibration table or curve.

For a normal workpiece distance measurement, determine the measurement distance by correlating the measurement DIC with a corresponding distance in the stored distance calibration data.

In the foregoing operations, the distance indicating coordinate DIC may be determined with sub-pixel resolution, based on the distance-indicating subset of data above MVthreshold. A measurement DIC may be determined according to one of a number of different methods. In one embodiment, a measurement DIC may be determined as the subpixel-resolution coordinate of a centroid $X_C$ of the distance-indicating subset of data. For example, for a detector with 1024 pixels, the centroid $X_C$ may be determined according to:

$$Xc = \frac{\sum_{p=1}^{1024} p(S_M(p))^n}{\sum_{p=1}^{1024} (S_M(p))^n} \quad \text{(Eq. 1)}$$

where, $$S_M(p) = \begin{cases} p - MVThreshold(ppic), & \text{for } MS_p \geq MVThreshold(ppic) \\ 0 & \text{for } MS_p < MVThreshold(ppic) \end{cases} \quad \text{(Eq. 2)}$$

In one specific example, n=2, in EQUATION 1. It will be appreciated that EQUATION 2 restricts the data used in the centroid calculation to a distance-indicating subset of data. When the distance indicating coordinate DIC is determined during calibration operations, it may be referred to as a calibration distance indicating coordinate, as well as a measurement distance indicating coordinate.

Figure 10:
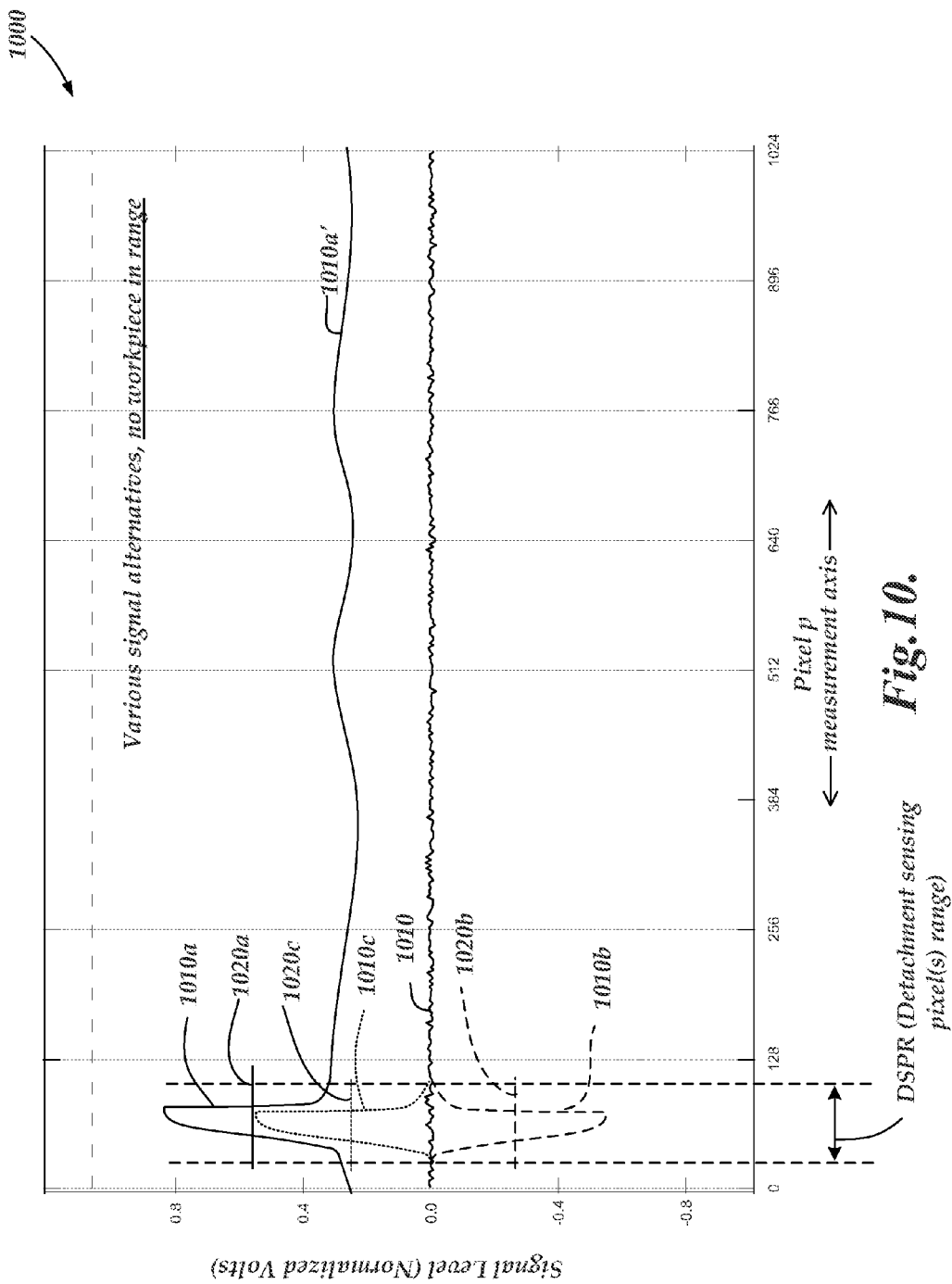
FIG. 10 is a diagram of profile data from a chromatic point sensor illustrating various signal processing alternatives for a signal corresponding to a detachment signal element.

FIG. 10 is a diagram of a graph 1000 of profile data from a chromatic point sensor illustrating various signal processing alternatives for the detachment sensing signal DSS of FIGS. 8 and 9. As shown in FIG. 10, in a first embodiment a signal 1010a may represent a raw uncompensated signal (e.g., from the pixels in the detector array 163) when an interchangeable optics element 280 is attached that includes a detachment signal element 299. In the case of the signal 1010a, it is shown in the context of the raw uncompensated pixel signals 1010a' obtained from a detector array (e.g., where the previously outlined background signals voltage offset signal Voffset(p) also appear uncompensated). If such raw signals are used to detect attachment/detachment of an interchangeable optics element, then a trigger voltage level 1020a, which is illustrated, may be used as representing a detachment trigger threshold for the raw uncompensated signal 1010a. More specifically, in one implementation, signal processing according to known methods may be provided such that if the raw uncompensated signal 1010a falls below the voltage level 1020a in the detachment sensing pixels range DSPR, a detachment condition may be detected. Conversely, a signal level above the voltage level 1020a in the detachment sensing pixels range DSPR, indicates an attached condition.

In an alternative embodiment, the detachment sensing signal DSS from an interchangeable optics element 280, which includes a detachment signal element 299, may be compensated along with voltage offset signals Voffset(p), as outlined above, such that the corresponding signal levels may be compensated or "canceled" in all subsequent profile data signals from each corresponding pixel p (e.g., by subtraction), on an ongoing basis. In such an embodiment, the compensated output signals from a wavelength detector may look like the signals 1010 shown in FIG. 10 when the compensated interchangeable optics element is properly attached. In such an embodiment, the signal portion 1010b represents a condition where the interchangeable optics element is detached.

More specifically, when the compensated interchangeable optics element is detached or absent and the detachment signal element 299 produces no reflected detachment element signal wavelengths, the compensation for the detachment element signal may drive the corresponding compensated pixel signals to the "negative peak" signal level 1010b as illustrated. In other words, if the compensation is made to include the detachment sensing signal DSS of FIG. 8, which is thus also subtracted to compensate the output of the detector, then if the interchangeable optics element 280 including the detachment signal element 299 is detached, the subtracted signal will include the negative peak signal 1010b. In this implementation, a trigger voltage level 1020b represents a detachment trigger threshold for the compensated signal 1010b. In other words, if the compensated signal 1010b becomes more negative than the voltage level 1020b in the detachment sensing pixels range DSPR, then a detachment condition may be detected. Conversely, a signal level less negative (more positive) than the voltage level 1020b in the detachment sensing pixels range DSPR (e.g., a near-zero or null signal at the level of the signal 1010) indicates an attached condition. As noted above, in such an embodiment, the compensated output signals from a wavelength detector may look like the signals 1010 when the compensated interchangeable optics element is properly attached and no measurement surface is within the measuring range.

Such an embodiment may be desirable in that the only significant signal expected in such an embodiment will be that from the workpiece surface 290 that is being measured. In some embodiments, this may allow wavelengths within the measuring range wavelengths to be used for the detachment signal, if desired. For example, the detachment signal element 299 may be only partially reflective of the detachment signal wavelengths, leaving enough transmission of the wavelengths such that they may also be used as measuring wavelengths. It may be appreciated that in such a case, a peak from a measured surface will be positive, and the signal from a detached probe will be negative, so appropriated detachment signal processing may be implemented according to known methods, without confusion.

In a further embodiment, the detachment sensing signal DSS from an interchangeable optics element 280, which includes a detachment signal element 299, may be uncompensated, while the voltage offset signals Voffset(p) may be compensated as outlined above. In such an embodiment, when the compensated interchangeable optics element is properly attached the compensated output signals from a wavelength detector may look like the signals 1010 shown in FIG. 10, except that the dashed line detachment signal peak 1010c will be present in the in the detachment sensing pixels range DSPR. In this implementation, a trigger voltage level 1020c represents a useful detachment trigger threshold. In other words, if the signal 1010c in the detachment sensing pixels range DSPR becomes more negative than the voltage level 1020c, then a detachment condition may be detected. Conversely, a signal level above the voltage level 1020c in the detachment sensing pixels range DSPR, indicates an attached condition.

Figure 11:
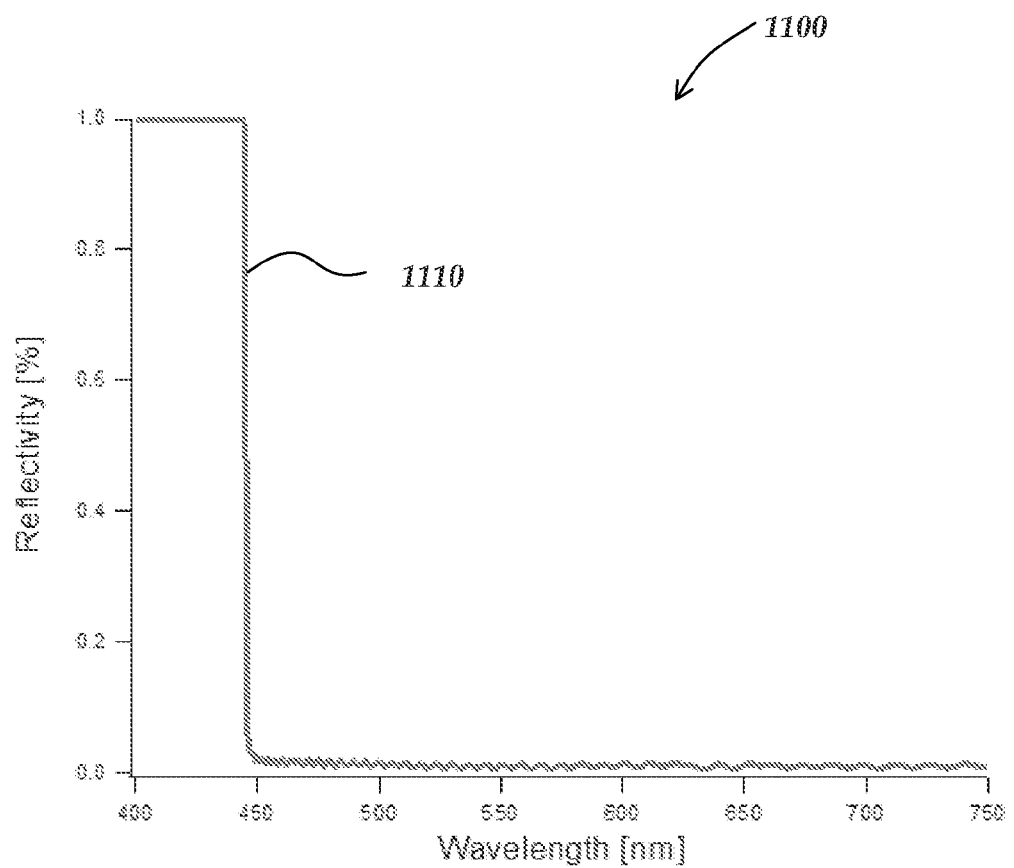
FIG. 11 is a diagram of a response curve representing the properties of one exemplary embodiment of a detachment signal element.

FIG. 11 is a diagram of a graph 1100 of a response curve 1110 representing the properties of one specific example embodiment of a detachment signal element 299. As described above, in various implementations, the detachment signal element 299 may be configured to substantially reflect the set of detachment signal element wavelengths. The detachment signal element may consist of elements such as a low pass reflective filter, a high pass reflective edge filter, a bandpass reflective filter, etc.

In the specific example embodiment of FIG. 11, the detachment signal element for which the response curve is shown comprises a thin film coating forming a sharp edge filter that is utilized as a low pass reflector. The response curve 1110 shows nearly a 100% reflectivity at wavelengths of 440 nm and below, while maintaining a high transmission over higher measurement wavelengths (e.g., above 450 nm). Such sharp edge filters are commercially available from companies such as Semrock Inc., of Rochester, N.Y., www.semrock.com. This type of response curve may be ideally suited for utilization in certain types of systems. As one specific example implementation, a light source 164 may be utilized which includes an LED for exciting a phosphor component for providing the measurement light. In such an implementation where the pump wavelength of the LED is 440 nm and the stable phosphor wavelengths utilized as the measurement wavelengths are in a range such as 500 nm to 700 nm, then the response curve illustrated in FIG. 11 would be relatively ideal.

In various implementations, it will be appreciated that the detachment signal element 299 may have various physical characteristics. For example, when implemented as a thin film or window, the detachment signal element may comprise a substrate less than 1 mm thick and in more specific implementations may fall within a range of 50 um to 250 um thick. In various implementations, the thin film reflective filter may be applied to an optical element that is also used for other purposes in an optical pen, such as a lens, a beam splitter, a sealing window, etc. The detachment signal element described above with reference to FIG. 11 may be used at any detachment signal element location disclosed herein. However, more economical elements may be used in various embodiments, provided that they are configured at the proper location corresponding to their optical characteristics, for example, as outlined above with reference to the detachment signal elements 299B, 299B', 299C, and 299C'.

Figure 12:
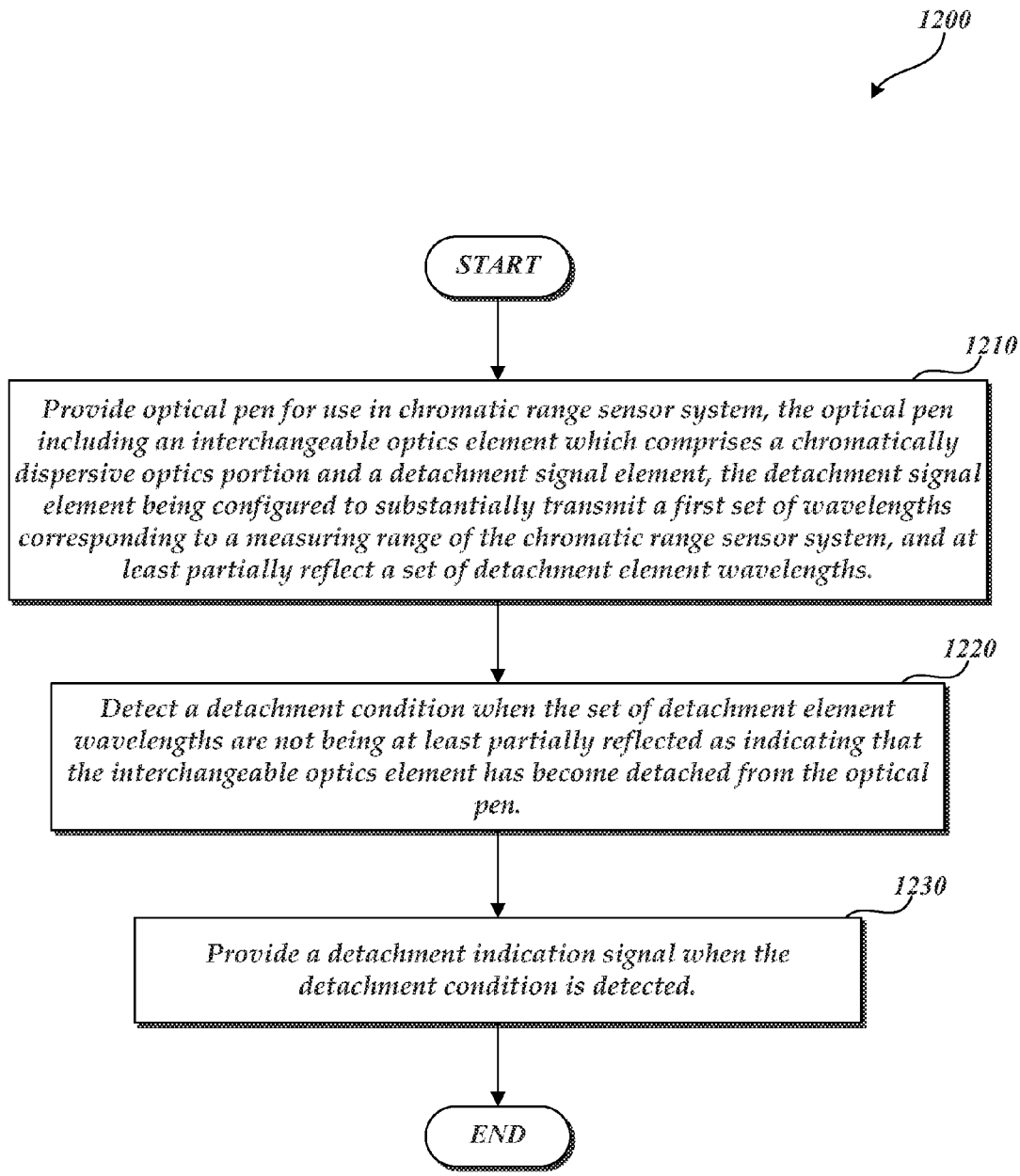
FIG. 12 is a flow diagram illustrating one exemplary embodiment of a routine for utilizing a detachment signal element for detecting a detachment condition.

FIG. 12 is a flow diagram illustrating one exemplary embodiment of a routine 1200 for utilizing a detachment signal element for detecting a detachment condition. At block 1210, an optical pen is provided including an interchangeable optics element which comprises a chromatically dispersive optics portion and a detachment signal element. The detachment signal element is configured to substantially transmit a first set of wavelengths corresponding to a measuring range of the chromatic range sensor system, and at least partially reflect a set of detachment element wavelengths. At block 1220, a detachment condition is detected in accordance with when the set of detachment element wavelengths are no longer being at least partially reflected, which is taken as an indication that the interchangeable optics element has become detached from the optical pen. At block 1230, a detachment indication signal is provided in response to the detachment condition having been detected. As described above, the detachment indication signal may be utilized for various purposes (e.g., causing a coordinate measuring machine to come to an immediate stop to prevent further damage in the event that a collision has occurred, etc.)

While various preferred embodiments of the invention have been illustrated and described, numerous variations in the illustrated and described arrangements of features and sequences of operations will be apparent to one skilled in the art based on this disclosure. For example, those skilled in the art will appreciate that the depicted flow chart may be altered in a variety of ways. More specifically, the order of the steps may be re-arranged, steps may be performed in parallel, steps may be omitted, other steps may be included, etc. Thus, it will be appreciated that various changes can be made therein without departing from the spirit and scope of the invention.

The embodiments of the invention in which an exclusive property or privilege is claimed are defined as follows:

1. An interchangeable optics element for an optical pen for use in a chromatic range sensor system that provides workpiece measurement information in a coordinate measuring machine (CMM), the optical pen comprising an optical pen base member that is fixed relative to a moving portion of the CMM and which includes an optical fiber that outputs source light that is transmitted through a confocal aperture, and receives reflected measurement signal light that is returned through the confocal aperture, the interchangeable optics element comprising:

a mounting portion that is received by the optical pen base member for holding the interchangeable optics element in a fixed relationship relative to the base member;

a chromatically dispersive optics portion configured to input source light from the confocal aperture, focus that light with longitudinal chromatic aberration along a measuring range, and return measurement signal light reflected from surfaces in the measuring range to the confocal aperture; and a detachment signal element that is positioned to receive the source light and is configured to:
      (a) substantially transmit a first set of wavelengths corresponding to the measuring range of the chromatic range sensor system; and
      (b) at least partially reflect a set of detachment signal element wavelengths to be returned back through the optical fiber so as to enable a detection of a detachment condition when the set of detachment element wavelengths are not being at least partially reflected, wherein the detachment condition indicates that the interchangeable optics element has become detached from the optical pen.

2. The interchangeable optics element of claim 1, wherein the set of detachment signal element wavelengths is not included in the first set of wavelengths corresponding to a measuring range.

3. The interchangeable optics element of claim 1, wherein the first set of wavelengths corresponding to a measuring range is detected by a wavelength detector that is also utilized to detect the set of detachment signal element wavelengths.

4. The interchangeable optics element of claim 1, wherein the detachment signal element wavelengths are shorter than the measuring range wavelengths.

5. The interchangeable optics element of claim 1, wherein the detachment signal element is configured to substantially reflect the set of detachment signal element wavelengths.

6. The interchangeable optics element of claim 1, wherein the detachment signal element comprises at least one of a low pass reflector filter, a high pass reflective edge filter or a bandpass reflective filter.

7. The interchangeable optics element of claim 1, wherein the set of detachment signal element wavelengths are deflected to follow a path different than the set of measuring range wavelengths in a detector portion of the chromatic range sensor.

8. The interchangeable optics element of claim 7, wherein the set of detachment signal element wavelengths are directed to a dedicated detachment signal element sensor.

9. The interchangeable optics element of claim 7, wherein the set of detachment signal element wavelengths are directed to a set of detachment signal pixels in a wavelength detector of the chromatic range sensor, which are used for sensing signals in the set of detachment signal element wavelengths.

10. The interchangeable optics element of claim 1, wherein when the interchangeable optics element is mounted to the base member, the set of detachment signal element wavelengths is returned back through the optical fiber indicating that the interchangeable optics element is attached.

11. The interchangeable optics element of claim 1, wherein the detachment signal element is positioned so as to be at least one of: proximate to the confocal aperture, proximate to where the source light is substantially focused in the interchangeable optics element, or proximate to where the source light is substantially collimated in the interchangeable optics element.

12. The interchangeable optics element of claim 1, wherein the detachment signal element comprises a thin film reflective filter.

13. The interchangeable optics element of claim 12, wherein the thin film reflective filter is applied to an optical element included in the interchangeable optics element and comprising at least one of a lens, a beamsplitter, a sealing window, or a transmissive substrate less than 1 millimeter thick.

14. The interchangeable optics element of claim 12, wherein the thin film reflective filter reflects light at a band of wavelengths that is outside of a wavelength range corresponding to the normal measurement range of the chromatic range sensor system.

15. A method for detecting a detachment condition for a chromatic range sensor system that provides workpiece measurement information in a coordinate measuring machine, the method comprising:
    providing an optical pen for use in the chromatic range sensor system, the optical pen including an interchangeable optics element that comprises a chromatically dispersive optics portion and a detachment signal element, the detachment signal element being configured to substantially transmit a first set of wavelengths corresponding to a measuring range of the chromatic range sensor system, and at least partially reflect a set of detachment element wavelengths;
    detecting a detachment condition when the set of detachment element wavelengths are not being at least partially reflected, the detachment condition indicating that the interchangeable optics element has become detached from the optical pen; and
    providing a detachment indication signal when the detachment condition is detected.

16. The method of claim 15, wherein the detachment signal element signal contributions are compensated, such that a compensated set of output signals from the system do not exhibit a peak at the set of detachment signal element wavelengths when the interchangeable optics element is attached to the optical pen.

17. The method of claim 16, wherein the compensated set of output signals from the system exhibit a negative peak at the set of detachment signal element wavelengths when the interchangeable optics element is detached.

18. The method of claim 15, wherein detachment signal element signal contributions from the system that are not compensated exhibit a peak at the set of detachment signal element wavelengths when the interchangeable optics element is attached.

19. The method of claim 18, wherein detachment signal element signal contributions from the system that are not compensated do not exhibit a peak at the set of detachment signal element wavelengths when the interchangeable optics element is detached.

20. An interchangeable optics element for an optical pen for use in a chromatic range sensor system that provides workpiece measurement information in a coordinate measuring machine (CMM), the optical pen comprising an optical pen base member that is fixed relative to a moving portion of the CMM and which includes and optical fiber that outputs source light that is transmitted through a confocal aperture, and receives reflected measurement signal light that is returned through the confocal aperture, the interchangeable optics element comprising:
    a mounting portion that is received by the optical pen base member for holding the interchangeable optics element in a fixed relationship relative to the base member;
    a chromatically dispersive optics portion configured to input source light from the confocal aperture, focus that light with longitudinal chromatic aberration along a measuring range, and return measurement signal light reflected from surfaces in the measuring range to the confocal aperture; and
    a detachment signal element that is positioned to receive the source light and is configure to:
        (a) substantially transmit a first set of wavelengths corresponding to the measuring range of the chromatic range sensor system; and
        (b) at least partially reflect a set of detachment signal element wavelengths to be returned back through the optical fiber, wherein the set of detachment signal element wavelenghts is detected by a set of detachment signal element wavelength sensing pixels that is not included in a set of pixels that sense the wavelengths corresponding to the measuring range.

* * * * *